(12) United States Patent
Niida

(10) Patent No.: US 7,955,174 B2
(45) Date of Patent: Jun. 7, 2011

(54) GAME PROGRAM

(75) Inventor: Koichi Niida, Tokyo (JP)

(73) Assignee: Nintendo Co., Ltd., Kyoto-shi (JP)

( * ) Notice: Subject to any disclaimer, the term of this patent is extended or adjusted under 35 U.S.C. 154(b) by 1282 days.

(21) Appl. No.: 11/541,664

(22) Filed: Oct. 3, 2006

(65) Prior Publication Data

US 2007/0078006 A1  Apr. 5, 2007

(30) Foreign Application Priority Data

Oct. 4, 2005 (JP) .................................. 2005-291372

(51) Int. Cl.
*G06F 17/00* (2006.01)
(52) U.S. Cl. ........................................................ 463/40
(58) Field of Classification Search ................ 463/37, 463/39, 40, 42, 43
See application file for complete search history.

(56) References Cited

U.S. PATENT DOCUMENTS

| | | | |
|---|---|---|---|
| 2007/0279396 A1* | 12/2007 | Miyagawa et al. | 345/173 |
| 2008/0012732 A1* | 1/2008 | Egashira | 340/990 |
| 2009/0062017 A1* | 3/2009 | Kelly et al. | 463/42 |
| 2009/0156303 A1* | 6/2009 | Kiely et al. | 463/29 |
| 2009/0244064 A1* | 10/2009 | Inokuchi et al. | 345/420 |

FOREIGN PATENT DOCUMENTS

JP   2784645   5/1998

* cited by examiner

*Primary Examiner* — Ronald Laneau

(74) *Attorney, Agent, or Firm* — Nixon & Vanderhye P.C.

(57) ABSTRACT

A CPU core of a game machine displays a game image on an LCD, executes a game process, and performs an updating process on the game image. Also, it is determined whether or not a result of the game process satisfies a predetermined condition, and if the result of the determination is affirmative, a touch coordinate is detected via a touch panel, and the result of the detection is transmitted to an opponent's game machine through a wireless communication portion. A touch coordinate from the opponent's game machine is received by the wireless communication portion at an arbitrary timing. Thus, when the opponent's touch coordinate is received, the CPU core displays an obstacle at the touch coordinate position within the LCD.

25 Claims, 19 Drawing Sheets

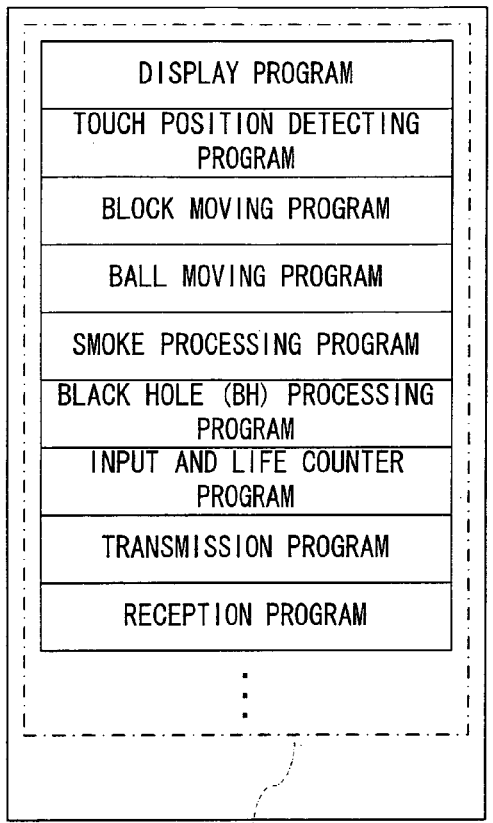

48

- DISPLAY PROGRAM
- TOUCH POSITION DETECTING PROGRAM
- BLOCK MOVING PROGRAM
- BALL MOVING PROGRAM
- SMOKE PROCESSING PROGRAM
- BLACK HOLE (BH) PROCESSING PROGRAM
- INPUT AND LIFE COUNTER PROGRAM
- TRANSMISSION PROGRAM
- RECEPTION PROGRAM

48a (B)

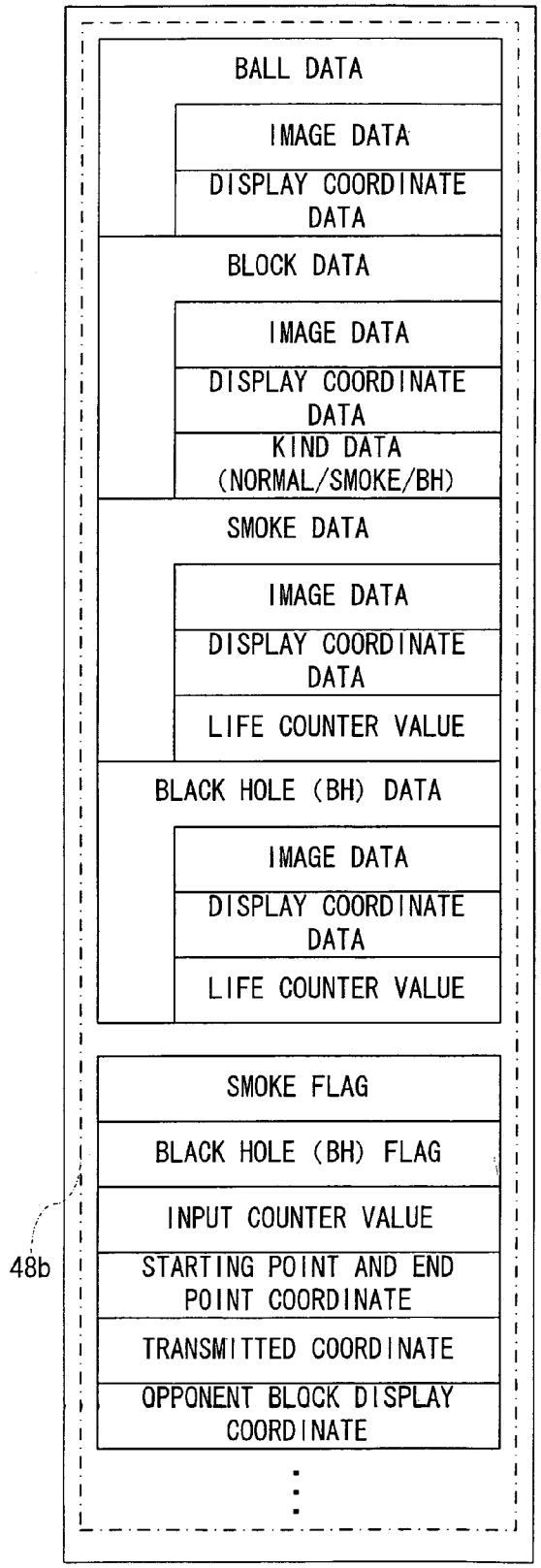

48

- BALL DATA
  - IMAGE DATA
  - DISPLAY COORDINATE DATA
- BLOCK DATA
  - IMAGE DATA
  - DISPLAY COORDINATE DATA
  - KIND DATA (NORMAL/SMOKE/BH)
- SMOKE DATA
  - IMAGE DATA
  - DISPLAY COORDINATE DATA
  - LIFE COUNTER VALUE
- BLACK HOLE (BH) DATA
  - IMAGE DATA
  - DISPLAY COORDINATE DATA
  - LIFE COUNTER VALUE
- SMOKE FLAG
- BLACK HOLE (BH) FLAG
- INPUT COUNTER VALUE
- STARTING POINT AND END POINT COORDINATE
- TRANSMITTED COORDINATE
- OPPONENT BLOCK DISPLAY COORDINATE

48b

FIG. 9
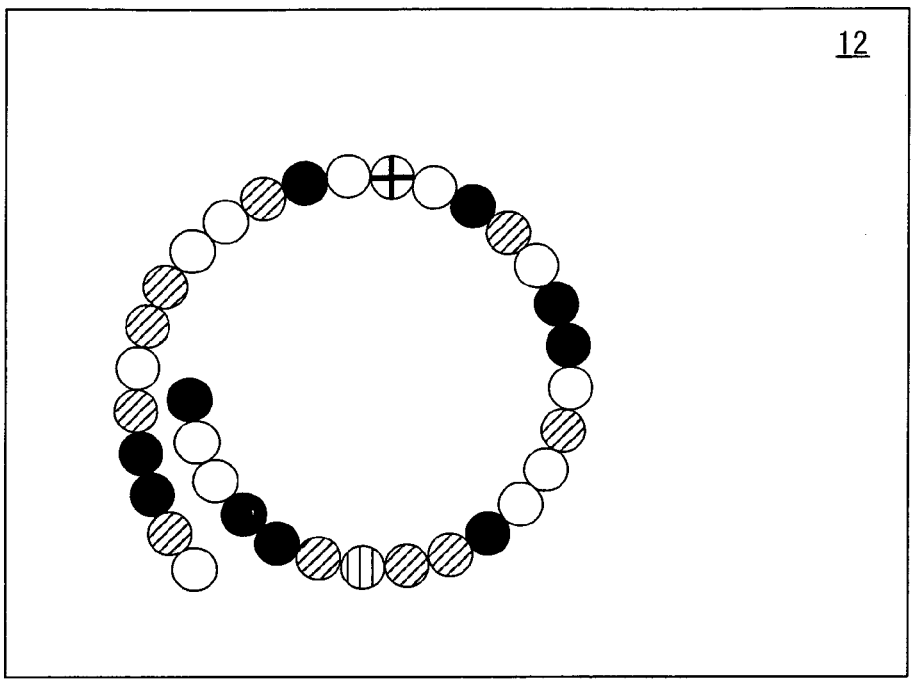
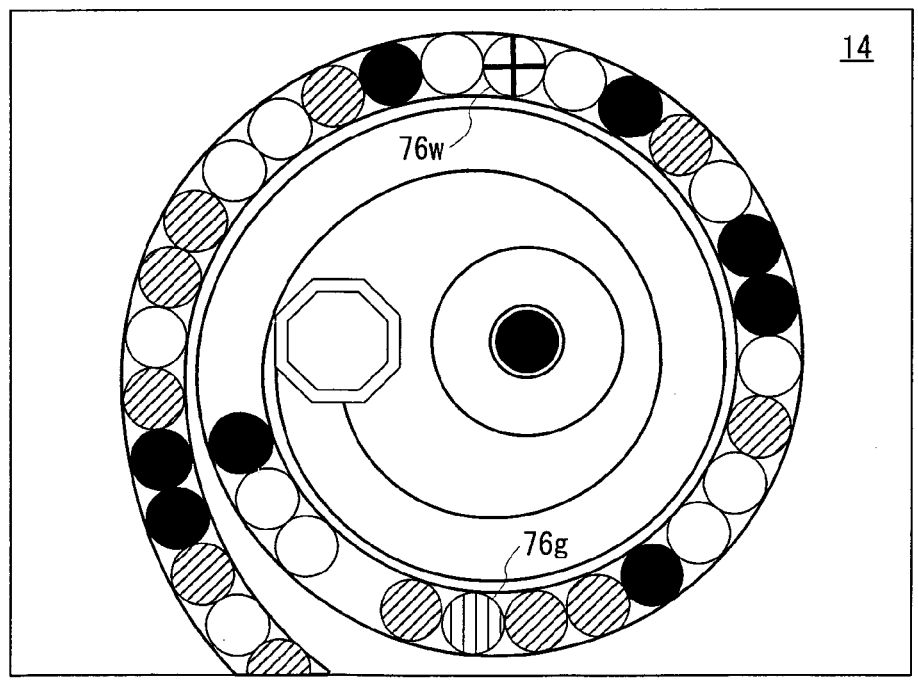
● RED  ○ BLUE  ▨ YELLOW  ▥ GRAY  ⊕ WHITE

FIG. 10
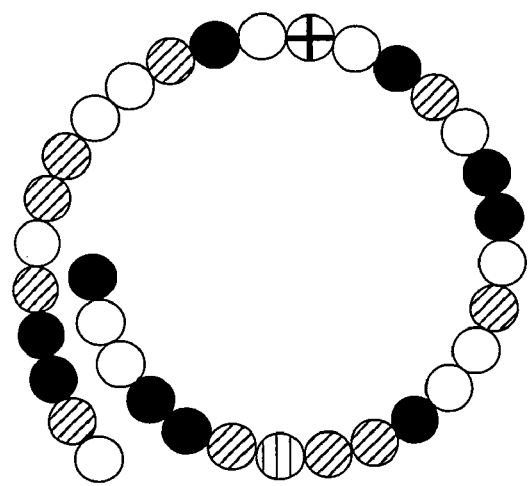
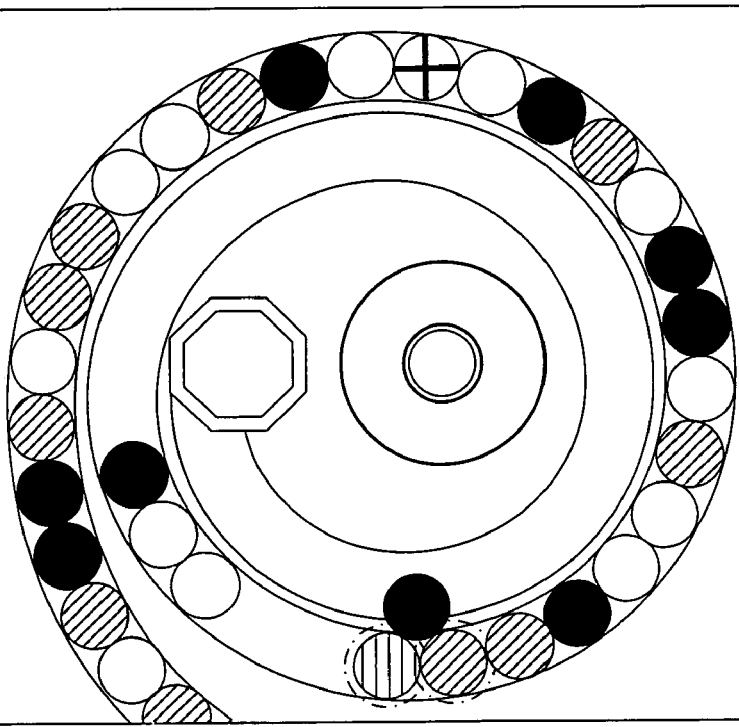

FIG. 12
SECOND GAME MACHINE
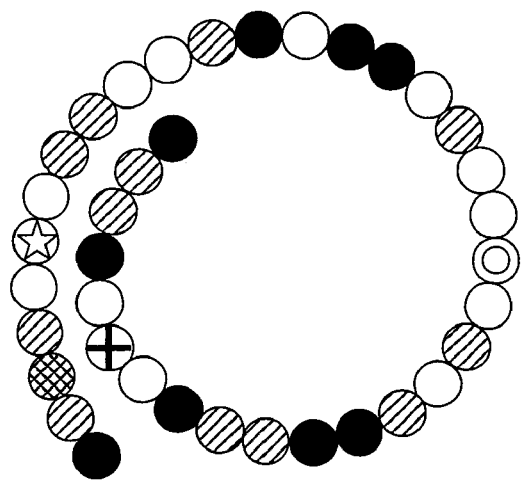
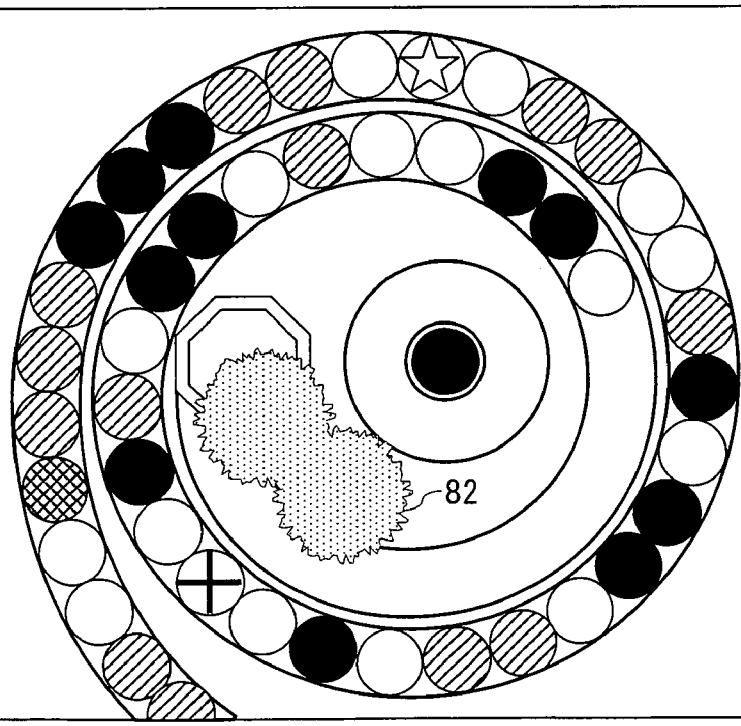

FIG. 13
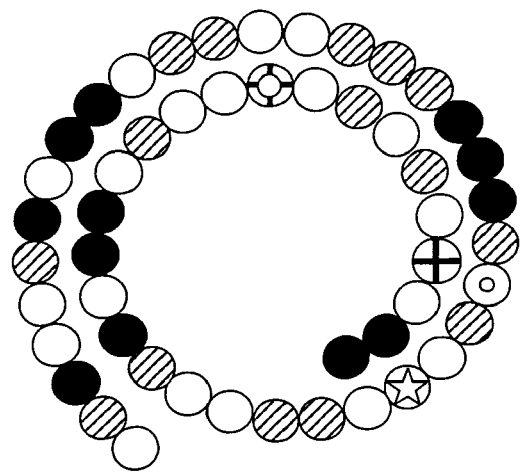
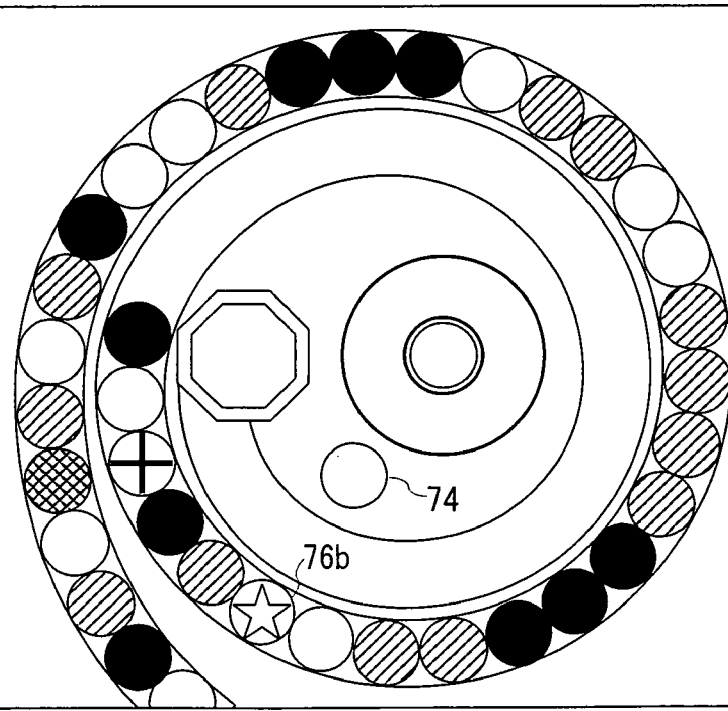
 BLACK

FIG. 15
SECOND GAME MACHINE
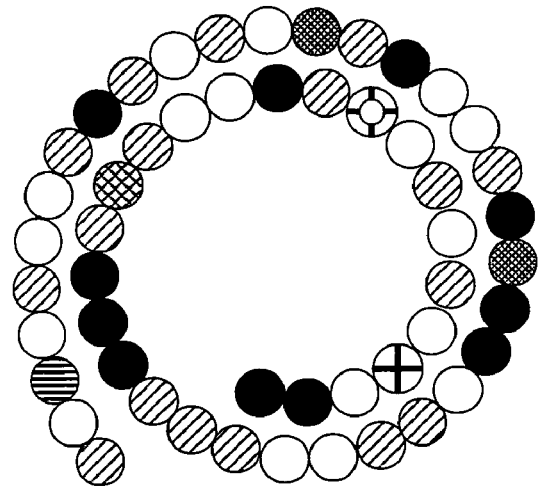
12
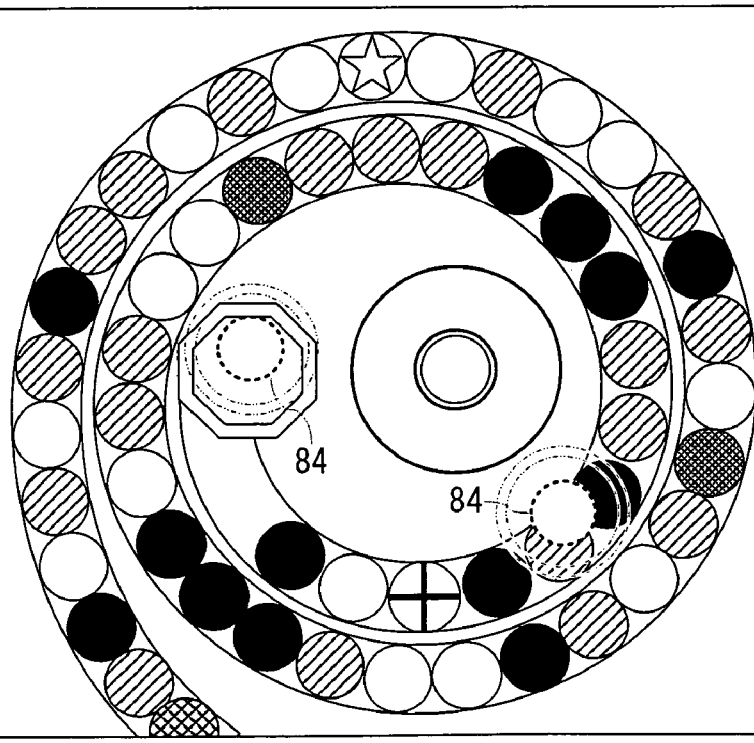
14

GAME PROGRAM

CROSS REFERENCE OF RELATED APPLICATION

The disclosure of Japanese Patent Application No. 2005-291372 is incorporated herein by reference.

BACKGROUND

1. Field of Example Embodiments of the Invention

Example embodiments of the present invention relate to a game program. More specifically, example embodiments of the present invention relate to a game program to display an obstacle which obstructs a game play on a screen.

2. Description of the Related Art

Such a kind of a conventional apparatus is disclosed in Japanese Patent No. 2784645. In the related art, if two players competitively play a puzzle game for aligning puzzles in a row, if a predetermined arrangement is completed on the screen of the one player, an obstacle is displayed on the screen of the other player.

According to the related art, according to the result of the playing of the one player, an obstacle is displayed on the screen of the other player, and therefore, it is possible to make an effective attack by means of the obstacle, capable of enhancing an interest of playing against another person. However, in the related art, the player could not control a display position of the obstacle, and thus could not perform an effective obstruction.

SUMMARY

Therefore, example embodiments of the present invention may provide a novel game program.

Example embodiments of the present invention may provide a game program capable of performing an effective obstruction to an opponent by means of an obstacle.

A game program according to a first example embodiment of the invention is a game program to play a communication game by utilizing two game machines. Each of the two game machines has a first screen, a coordinate designating means, a communication device, and a processor. The coordinate designating means designates a coordinate on the first screen. The game program causes each of the processors of the two game machines to execute a game processing step, a game image generating step, a first displaying step, a determining step, a first transmitting step, and a second displaying step.

The game processing step executes a game process in response to an operation by a player. The game image generating step generates a game image according to a result of the process by the game processing step. The first displaying step displays the game image on the first screen. The determining step determines whether or not a predetermined condition is satisfied. The first transmitting step transmits the designated coordinate detected by the coordinate designating means to the opponent's game machine through the communication device when the condition is satisfied by the determining step. The second displaying step displays an obstacle image at a position corresponding to the designated coordinate on the game image when the designated coordinate is received by the communication device.

In the first example embodiment of the invention, a game program is executed by each of the processors (42) of two game machines (10: reference numerals corresponding in the embodiment and so forth). Each of the two game machines has a first screen (14), a coordinate designating means (22), and a communication device (64) in addition to the processor.

A game processing is executed in response to an operation of a player by a game processing step (S13). A game image is generated by a game image generating step (S5) according to the result of the processing by the game processing step, and displayed on the first screen by a first displaying step (S15). Whether or not a predetermined condition is satisfied is determined by a determining step (S73). A first transmitting step (S101) transmits the designated coordinate detected by the coordinate designating means to the opponent's game machine through the communication device when the condition is satisfied by the determining step. A second displaying step (S119, S123) displays an obstacle image (82, 84) at a position corresponding to the designated coordinate on the game image when the designated coordinate is received by the communication device.

According to the first example embodiment of the invention, when the predetermined condition is satisfied, a designated coordinate is detected. Then, the detected designated coordinate is transmitted to the opponent's game machine, and an obstacle image is combined and displayed at the position corresponding to the designated coordinate on the opponent's game image. In other words, the player makes a designating operation on the coordinate of the first screen after the satisfaction of the condition to thereby combine and display an obstacle image at the position the same as that on the opponent's game image. Thus, it is possible to place an effective obstruction on the opponent by means of the obstacle.

A game program according to a second example embodiment of the invention is depending on the first example embodiment of the invention, and the determining step determines whether or not the result of the processing by the game processing step satisfies a predetermined condition.

A game program according to a third example embodiment of the invention is depending on the first example embodiment of the invention, and the game processing step executes a game process according to the designated coordinate detected by the coordinate designating means.

A game program according to a fourth example embodiment of the invention is depending on the third example embodiment of the invention, and the game processing step executes a game process according to the designated coordinate detected by the coordinate designating means when it is determined that the predetermined condition is not satisfied by the determining step, and stops the game process according to the designated coordinate detected by the coordinate designating means when it is determined that the predetermined condition is satisfied.

According to the fourth example embodiment of the invention, the coordinate detection for display of the obstacle and the coordinate detection for the game processing are switched depending on the result of the determination by the determining step, and therefore, is, it is possible to accurately perform two kinds of touch coordinate detection by one coordinate designating means.

A game program according to a fifth example embodiment of the invention is depending on the first example embodiment of the invention, and the game image generating step generates a game image including a first image which is displayed at a predetermined position on the first screen irrespective of an operation by the player and a second image whose display position is changed according to an operation by the player.

A game program according to a sixth example embodiment of the invention is depending on the fifth example embodiment of the invention, and the game image generating step generates a game image such that a positional relationship between the predetermined position in the one game machine and the predetermined position in the other game machine are associated with each other.

According to the sixth example embodiment of the invention, a positional relationship between the display position of the first image on the first screen of the one game machine and the display position of the first image on the first screen of the other game machine are associated with each other, and therefore, it is possible to display an obstacle image at a suitable position.

A game program according to a seventh example embodiment of the invention is depending on the fifth example embodiment of the invention, and causes each of the processors of the two game machines to further execute a second transmitting step and a third displaying step. Each of the two game machines further includes a second screen. A second transmitting step transmits a display coordinate of the second image displayed by the game image generating step through the communication device. A third displaying step displays on the second screen arrangement information of the second image of the opponent's game machine on the basis of the display coordinate received by the communication device.

In the seventh example embodiment of the invention, the display coordinate of the second image displayed by the game image generating step is transmitted by a second transmitting step (S141) via the communication device. The display coordinate transmitted from the opponent's game machine is received by the communication device. A third displaying step (S93) displays on the second screen (12) arrangement information of the second image of the opponent's game machine on the basis of the display coordinate received by the communication device.

According to the seventh example embodiment of the invention, the arrangement information of the second image displayed on the opponent's first screen can be displayed on the second screen, and therefore, with further reference to the second screen, it is possible to display the obstacle image at a more suitable position on the first screen of the opponent's game machine.

A game program according to an eighth example embodiment of the invention is depending on the first example embodiment of the invention, and the second displaying step executes a displaying process over a predetermined time period.

In the eighth example embodiment of the invention, the obstacle displayed on the first screen is erased after a lapse of a predetermined time period.

According to the eighth example embodiment of the invention, a life is set to the obstacle, and thereby, it is possible to reduce an obstructive action by the obstacle.

A game program according to a ninth example embodiment of the invention is depending on the eighth example embodiment of the invention, and the second displaying step erases the display of the obstacle image when the designated coordinate detected by the coordinate designating means is included in the display area of the obstacle image.

In the ninth example embodiment of the invention, the obstacle displayed on the first screen is erased in response to a coordinate designation with respect to the obstacle.

According to the ninth example embodiment of the invention, the obstacle can be erased by the coordinate designation, and whereby, a more complicated and accurate coordinate designating operation is required, improving the competitiveness of the game.

A game program according to a tenth example embodiment of the invention is depending on the first example embodiment of the invention, and the first displaying step includes a target displaying step for displaying a target and a bullet displaying step for displaying a bullet, and the processing step includes a target moving step for moving the target displayed by the target displaying step to a predetermined direction, a direction determining step for determining a direction on the basis of the touch coordinate detected by the second detecting step, a bullet moving step for moving the bullet in the direction determined by the direction determining step, and a disappearing step for causing the target to disappear when the bullet hits the target.

In the tenth example embodiment of the invention, a target (76, 76g, 76b, 76w) is displayed by a target displaying step (S3), and moved in a predetermined direction by a target moving step (S5). A bullet (74) is displayed by a bullet displaying step (S7), and moved by a bullet moving step (S15). The moving direction of the bullet is determined by a direction determining step (S13) on the basis of the touch coordinate (P1, P2) detected by the second detecting step. When a bullet hits any one of the plurality of targets, the target disappears by a disappearing step (S87).

A game program according to an eleventh example embodiment of the invention is depending on the tenth example embodiment of the invention, and the predetermined condition is a condition that a bullet hits a specific target (76g, 76b, 76w).

A game program according to a twelfth example embodiment of the invention is depending on the tenth example embodiment of the invention, and the obstacle absorbs the bullet.

A game program according to the thirteenth example embodiment of the invention is depending on the tenth example embodiment of the invention, and the obstacle changes the moving direction of the bullet.

A game machine according to the fourteenth example embodiment of the invention comprises a first displaying means (S3, S7) for displaying a game image on a first screen (14), a touch panel (22) provided on the first screen, a processing means (S5, S13, S15, S87) for executing a game process, and performing an updating process on the game image, a determining means (S73, S77, S79, S45) for determining whether or not the result of the game process executed by the processing means satisfies a predetermined condition, a first detecting means (S47) for detecting a touch coordinate via the touch panel when it is determined that the result satisfies the condition by the determining means, a first transmitting means (S101) for transmitting the result of the detection by the first detecting means to an opponent's game machine, and a second displaying means (S119, S123) for displaying an obstacle (82, 84) at a position corresponding to the touch coordinate when the touch coordinate is received from the opponent's game machine.

In the fourteenth example embodiment of the invention also, similarly to the first example embodiment of the invention, it is possible to place an effective obstruction with respect to the opponent by means of the obstacle.

A control method according to a fifteenth example embodiment of the invention is a control method of two game machines (10) each having a first screen (14), a coordinate designating means (22) to designate a coordinate on the first screen, and a communication device (64), and the control method causes each of the two game machines to execute a game processing step (S13) for executing a game process in response to an operation by a player, a game image generating step (S5) for generating a game image according to the result of the process by the game processing step, a first displaying step (S15) for displaying the game image on the first screen, a determining step (S73) for determining whether or not a predetermined condition is satisfied, a first transmitting step (S101) for transmitting the designated coordinate detected by the coordinate designating means to the opponent's game machine via the communication device when it is determined the condition is satisfied by the determining step, and a second displaying step (S119, S123) for displaying an obstacle image at a position corresponding to the designated coordinate on the game image when the designated coordinate is received by the communication device.

In the fifteenth example embodiment of the invention, similarly to the first example embodiment of the invention, it is possible to place an effective obstruction with respect to the opponent by means of an obstacle.

According to example embodiments of the present invention, by placing an obstacle which obstructs an opponent's view, it is possible to place an effective obstruction with respect to the opponent by means of an obstacle.

The above described features, aspects and advantages of example embodiments of the present invention will become more apparent from the following detailed description of example embodiments of the present invention when taken in conjunction with the accompanying drawings.

BRIEF DESCRIPTION OF THE DRAWINGS

FIG. 3 (A) is an illustrative view showing a part of a memory map applied to FIG. 1 embodiment, and FIG. 3 (B) is an illustrative view showing another part of the memory map applied to FIG. 1 embodiment;

FIG. 9 is an illustrative view showing the other example of the LCD display applied to FIG. 1 embodiment;

FIG. 10 is an illustrative view showing a further example of the LCD display applied to FIG. 1 embodiment;

FIG. 12 is an illustrative view showing the other example of the LCD display applied to FIG. 1 embodiment;

FIG. 13 is an illustrative view showing a further example of the LCD display applied to FIG. 1 embodiment;

FIG. 15 is a flowchart showing a part of an operation of a CPU applied to FIG. 1 embodiment;

DETAILED DESCRIPTION OF THE PREFERRED NON-LIMITING EXAMPLE EMBODIMENTS

Figure 1:
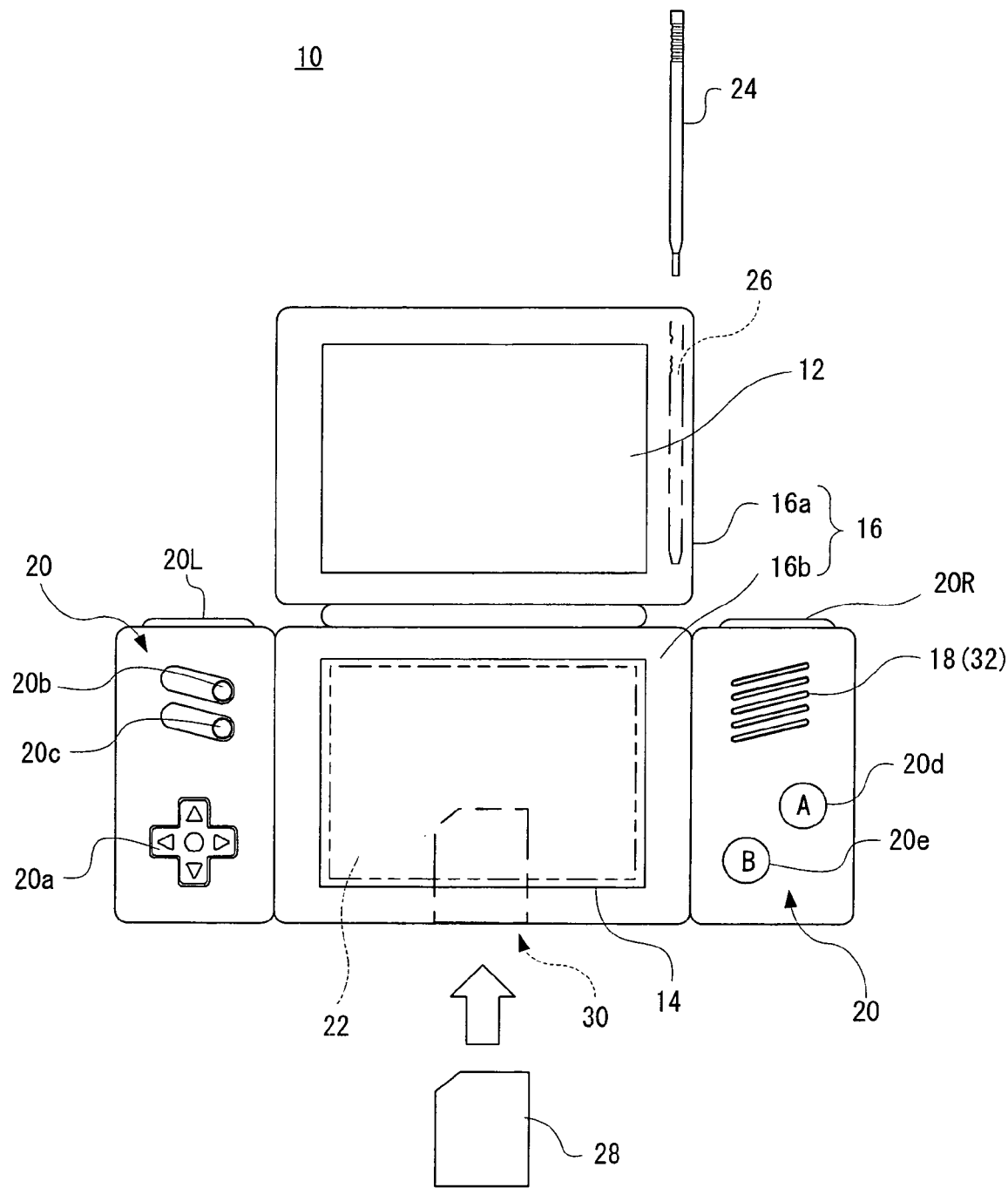
FIG. 1 is a block diagram showing one embodiment of the present invention.

Referring to FIG. 1, a game apparatus 10 of one embodiment of this invention includes a first liquid crystal display (LCD) 12 and a second LCD 14. The LCD 12 and the LCD 14 are provided on a housing 16 so as to be arranged in a predetermined position. In this embodiment, the housing 16 comprises an upper housing 16a and a lower housing 16b, and the LCD 12 is provided on the upper housing 16a while the LCD 14 is provided on the lower housing 16b. Accordingly, the LCD 12 and the LCD 14 are closely arranged so as to be longitudinally (vertically) parallel with each other.

In addition, although the LCD is utilized as a display in this embodiment, an EL (Electronic Luminescence) display and a plasma display may be used in place of the LCD.

As can be understood from FIG. 1, the upper housing 16a has a plane shape slightly larger than a plane shape of the LCD 12, and has an opening formed so as to expose a display surface of the LCD 12 from one main surface thereof. On the other hand, a plane shape of the lower housing 16b is oblonger than the upper housing 16a, and has an opening formed so as to expose a display surface of the LCD 14 at an approximately center of the horizontal direction. Furthermore, the lower housing 16b is provided with a sound hole 18 and an operating switch 20 (20a, 20b, 20c, 20d, 20e, 20L and 20R).

In addition, the upper housing 16a and the lower housing 16b are rotatably connected at a lower side (lower edge) of the upper housing 16a and a part of an upper side (upper edge) of the lower housing 16b. Accordingly, in a case of not playing a game, for example, if the upper housing 16a is rotatably folded such that the display surface of the LCD 12 and the display surface of the LCD 14 are face to face with each other, it is possible to prevent the display surface of the LCD 12 and the display surface of the LCD 14 from being damaged such as a flaw, etc. However, the upper housing 16a and the lower housing 16b are not necessarily rotatably connected with each other, and may alternatively be provided integrally (fixedly) to form the housing 16.

The operating switch 20 includes a direction designating switch (cross switch) 20a, a start switch 20b, a select switch 20c, an action switch (A button) 20d, an action switch (B button) 20e, an action switch (L button) 20L, and an action switch (R button) 20R. The switches 20a, 20b and 20c are placed at the left of the LCD 14 on the one main surface of the lower housing 16b. Also, the switches 20d and 20e are placed at the right of the LCD 14 on the one main surface of the lower housing 16b. Furthermore, the switches 20L and 20R are placed in a part of an upper edge (top surface) of the lower housing 16b at a place except for a connected portion with the upper housing 16a, and lie of each side of the connected portion.

The direction designating switch 20a functions as a digital joystick, and is utilized for instructing or designating a moving direction of a player character (or player object) to be operated by a player and a cursor, and so forth by operating any one of four depression portions. The start switch 20b is formed by a push button, and is utilized for starting (restarting), temporarily stopping a game, and so forth. The select switch 20c is formed by a push button, and utilized for a game mode selection, etc.

The action switch 20d, that is, the A button is formed by a push button, and allows the player character to perform an arbitrary movement (action), except for instructing the direction, such as hitting (punching), throwing, holding (acquiring), riding, jumping, cutting, etc. For example, in an action game, it is possible to apply an instruction of jumping, punching, moving weapon, etc. In a role-playing game (RPG) and a simulation RPG, it is possible to apply an instruction of obtaining an item, selecting and determining weapon or command, etc. The action switch 20e, that is, the B button is formed by a push button, and is utilized for changing a game mode selected by the select switch 20c, canceling an action determined by the A button 20d, and so forth.

The action switch (L button) 20L and the action switch (R button) 20R are formed by push buttons, and the L button 20L and the R button 20R can perform the same operation as the A button 20d and the B button 20e, and also function as a subsidiary of the A button 20d and the B button 20e.

Additionally, on a top surface of the LCD 14, a touch panel 22 is provided. As the touch panel 22, any one of kinds of a resistance film system, an optical system (infrared ray system) and an electrostatic capacitive coupling system, for example, can be utilized. In response to an operation by depressing, stroking, touching, hitting, and so forth with a stick 24, a pen (stylus pen), or a finger (hereinafter, referred to as "stick or the like 24") on a top surface of the touch panel 22, the touch panel 22 detects a coordinates position operated by the stick or the like 24 (that is, touched) to output coordinates data corresponding to the detected coordinates.

In addition, a resolution of the display surface of the LCD 14 is 256 dots×192 dots, and a detection accuracy of a detection surface (operation surface) of the touch panel 22 is also rendered as 256 dots×192 dots in correspondence to the resolution of the display surface (this is true for the LCD 12). However, in FIG. 1, in order to simply represent the touch panel 22, the touch panel 22 is displayed different from the LCD 14 in size, but the display screen of the LCD 14 and the operation screen of the touch panel 22 are the same in size. It should be noted that the detection accuracy of the touch panel 22 may be lower than the resolution of the display surface, or higher than it.

Different game screens may be displayed on the LCD 12 and the LCD 14. For example, in a racing game, a screen viewed from a driving seat is displayed on the one LCD, and a screen of entire race (course) may be displayed on the other LCD. Furthermore, in the RPG, characters such as a map, a player character, etc. are displayed on the one LCD, and items belonging to the player character may be displayed on the other LCD. Furthermore, a game play screen may be displayed on the one LCD (LCD 12 in this embodiment), and a game screen (operation screen) including an image such as diagram information, an icon, etc. for operating the game may be displayed on the other LCD (LCD 14 in this embodiment). Furthermore, by utilizing the two LCD 12 and LCD 14 as one screen, it is possible to display a large monster (enemy character) to be defeated by the player character.

Accordingly, the player is able to point a character image such as a player character, an enemy character, an item character, diagram information, an icon, etc. to be displayed on the LCD 14 and select commands by operating the touch panel 22 with the use of the stick or the like 24.

In addition, depending on the kind of the game, the player is able to use the LCD 14 for another various input instructions, such as selecting or operating the icon displayed on the LCD 14, instructing a coordinate input, and so forth.

Thus, the game apparatus 10 has the LCD 12 and the LCD 14 as a display portion of two screens, and by providing the touch panel 22 on an upper surface of any one of them (LCD 14 in this embodiment), the game apparatus 10 has the two screens (12, 14) and the operating portions (20, 22) of two systems.

Furthermore, in this embodiment, the stick 24 can be inserted into a housing portion (slot or concave) 26 provided in proximity to a side surface (right side surface) of the upper housing 16a, for example, and taken out therefrom as necessary. However, in a case of preparing no stick 24, it is not necessary to provide the housing portion 26.

Also, the game apparatus 10 includes a memory card (or game cartridge) 28. The memory card 28 is detachable, and inserted into a loading slot 30 provided on a rear surface or a lower edge (bottom surface) of the lower housing 16b. Although omitted in FIG. 1, a connector 46 (see FIG. 2) is provided at a back portion of the loading slot 30 for connecting a connector (not shown) provided at an end portion of the memory card 28 in the loading direction, and when the memory card 28 is loaded into the loading slot 30, the connectors are connected with each other, and therefore, the memory card 28 is accessible by a CPU core 42 (see FIG. 2) of the game apparatus 10.

Although not illustrated in FIG. 1, a speaker 32 (see FIG. 2) is provided at a position corresponding to the sound release hole 18 inside the lower housing 16b.

Furthermore, although omitted in FIG. 1, a battery accommodating box is provided on a rear surface of the lower housing 16b, for example, and a power switch, a volume switch, an external expansion connector, an earphone jack, etc. are provided on a bottom surface of the lower housing 16b.

Figure 2:
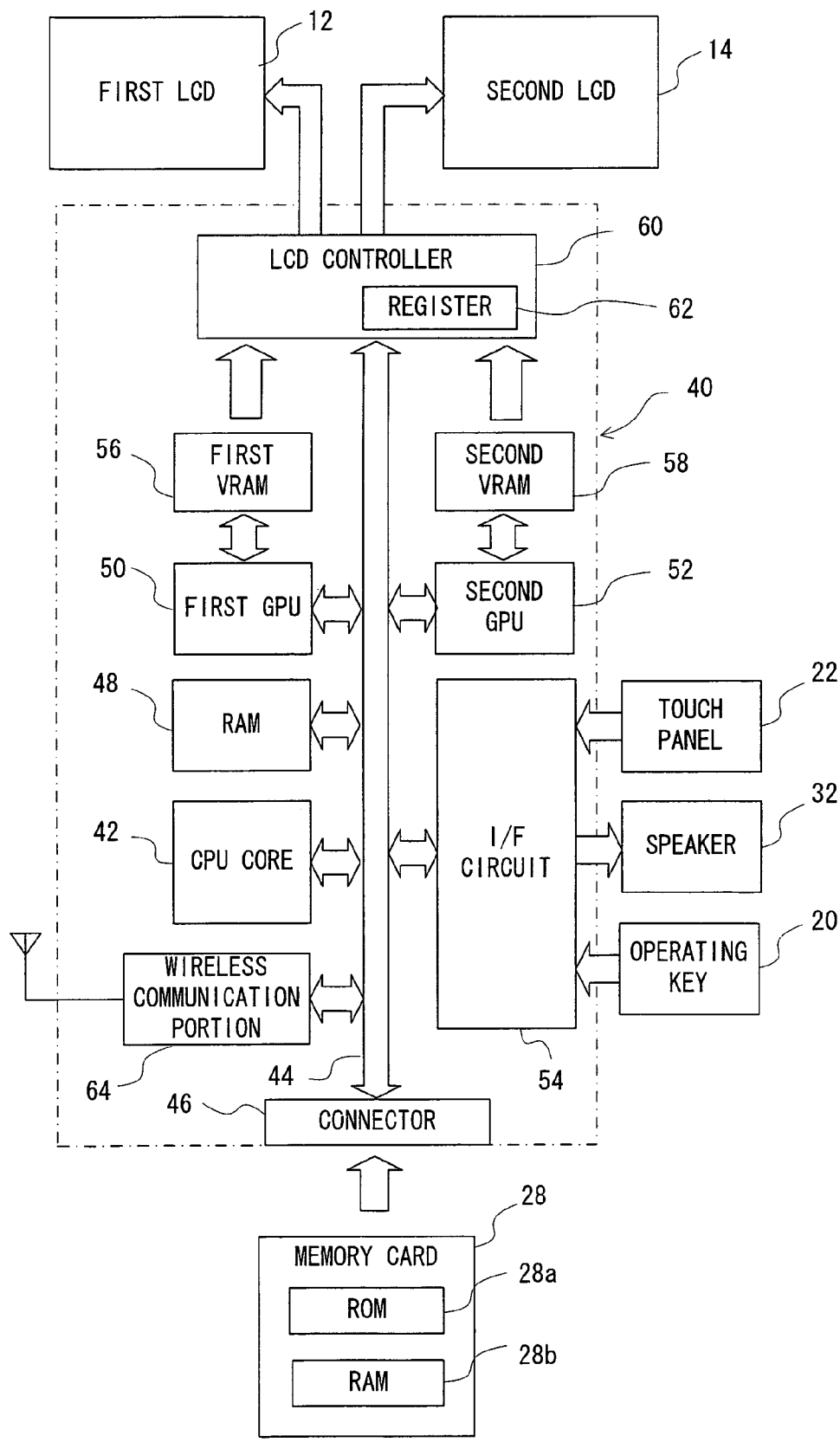
FIG. 2 is a block diagram showing an electric configuration of FIG. 1 embodiment.

FIG. 2 is a block diagram showing an electrical configuration of the game apparatus 10. Referring to FIG. 2, the game apparatus 10 includes an electronic circuit board 40, and on the electronic circuit board 40, circuit components, such as a CPU core 42, etc. are mounted. The CPU core 42 is connected to the connector 46 via a bus 44, and is connected with a RAM 48, a first graphics processing unit (GPU) 50, a second GPU 52, and an input-output interface circuit (hereinafter, referred to as "I/F circuit") 54, an LCD controller 60, and a wireless communication portion 64.

The connector 46 is detachably connected with the memory card 28 as described above. The memory card 28 includes a ROM 28a and a RAM 28b, and although illustration is omitted, the ROM 28a and the RAM 28b are connected with each other via a bus and also connected with a connector (not shown) to be connected with the connector 46. Accordingly, the CPU core 42 can access to the ROM 28a and the RAM 28b as described above.

The ROM 28a stores in advance a game program for a game (virtual game) to be executed by the game apparatus 10, in addition thereto, image data (character image, background image, item image, icon (button) image, message image, etc.), data of the sound (music) necessary for the game (sound data), etc. The RAM (backup RAM) 28b stores (saves) proceeding data and result data of the game.

The RAM 48 is utilized as a buffer memory or a working memory. That is, the CPU core 42 loads the game program, the image data, the sound data, etc. stored in the ROM 28a of the memory card 28 into the RAM 48, and executes the loaded game program. The CPU core 42 executes a game process while storing data (game data, flag data, etc.) generated or obtained in correspondence with a progress of the game in the RAM 48.

Additionally, the game program, the image data, the sound data, etc. are loaded from the ROM 28a entirely at a time, or partially and sequentially as necessary so as to be stored into the RAM 48.

However, a program as to an application except for the game and image data required to execute the application may be stored in the ROM 28a of the memory card 28. In addition, sound (music) data may be stored therein as necessary. In such a case, in the game apparatus 10, the application is executed.

Each of the GPU 50 and the GPU 52 forms a part of a rendering means, is constructed by, for example, a single chip ASIC, and receives a graphics command (construction command) from the CPU core 42 to generate game image data according to the graphics command. The CPU core 42 applies an image generation program (included in the game program) to both of the GPU 50 and GPU 52.

Furthermore, the GPU 50 is connected with a first video RAM (hereinafter referred to as "VRAM") 56, and the GPU 52 is connected with a second VRAM 58. The GPU 50 and the GPU 52 respectively access the first VRAM 56 and the second VRAM 58 to obtain necessary data (image data: character data, texture data, etc.) necessary for executing the graphics command. The CPU core 42 reads image data necessary for rendering from the RAM 48, and writes it to the first VRAM 56 and the second VRAM 58 via the GPU 50 and the GPU 52. The GPU 50 accesses the VRAM 56 to generate game image data for display, and stores it in a rendering buffer in the VRAM 56. The GPU 52 accesses the VRAM 58 to produce game image data for display, and stores the image data in a rendering buffer of the VRAM 58. A flame buffer or a line buffer may be employed as a rendering buffer.

The VRAM 56 and the VRAM 58 are connected to the LCD controller 60. The LCD controller 60 includes a register 62, and the register 62 consists of, for example, one bit, and stores a value of "0" or "1" (data value) according to an instruction of the CPU core 42. The LCD controller 60 outputs the game image data created by the GPU 50 to the LCD 12, and outputs the game image data created by the GPU 52 to the LCD 14 in a case that the data value of the register 62 is "0". On the other hand, the LCD controller 60 outputs the game image data created by the GPU 50 to the LCD 14, and outputs the game image data created by the GPU 52 to the LCD 12 in a case that the data value of the register 62 is "1".

In addition, the LCD controller 60 can directly read the game image data from the VRAM 56 and the VRAM 58, or read the game image data from the VRAM 56 and the VRAM 58 via the GPU 50 and the GPU 52.

Also, the VRAM56 and the VRAM58 may be provided in the RAM 48, or the rendering buffer and a Z buffer may be provided in the RAM 48.

The I/F circuit 54 is connected with the operating switch 20, the touch panel 22 and the speaker 32. Here, the operating switch 20 is the above-described switches 20a, 20b, 20c, 20d, 20e, 20L and 20R, and in response to an operation of the operating switch 20, a corresponding operation signal (operation data) is input to the CPU core 42 via the I/F circuit 54. Furthermore, operation data output from the touch panel 22 (coordinates data) is input to the CPU core 42 via the I/F circuit 54. In addition, the CPU core 42 reads from the RAM 48 the sound data necessary for the game, such as a game music (BGM), a sound effect or voices of a game character (onomatopoeic sound), etc., and outputs it from the speaker 32 via the I/F circuit 54.

The wireless communication portion 64 is a communication means for wirelessly sending and receiving data with other game apparatus 10 or communications equipment. The wireless communication portion 64 modulates communication data to be transmitted to the opponent into a radio signal to send it from an antenna, and receives a radio signal from the opponent by the same antenna to demodulate it to communication data. Via the wireless communication portion 64, the game apparatus 10 sends and receives data with other game apparatus 10 to execute a communication game. The wireless communication portion 64 is compatible with IEEE 802.11 (Wi-Fi), for example, and can send and receive data with other game apparatus 10 and communications equipment by a wireless LAN. The game apparatus 10 may execute a communication game with other nearby game apparatus 10, for example, by the wireless LAN. Also, the game apparatus 10 can send and receive data with other computer, server, and game apparatus 10, etc. over the Internet by utilizing the TCP/IP Protocol. Accordingly, the game apparatus 10 can access an Internet service provider (ISP) through a wireless LAN access point, such as a household LAN, a public wireless LAN, or the like so as to be connected to a network such as, the Internet or the WAN (Wide Area Network) via the ISP. This allows a game apparatus 10 to play a communication game with other game apparatus 10 which is connected to the Internet away from the game apparatus 10.

It should be noted that although a description is made on a case that the wireless communication portion 64 works according to a wireless LAN standard in this embodiment, this may work according to another wireless communication standard, such as Bluetooth, for example, in another embodiment.

Also, the wireless communication portion 64 can execute a wireless communication on the basis of a time division multiple access system, for example. The communication game with other nearby game apparatus 10 may be executed by the wireless communication system. For example, each game apparatus 10 is assigned a time slot during one communication cycle, and by the assigned slot, its own data is transmitted. It should be noted that for more information, a technique of such a wireless communication is described in detail in Japanese Patent Publication No. 2004-135778 and 2004-136009 by the present applicant.

The RAM 48 includes a program storage area 48a and a data storage area 48b. Referring to FIG. 3 (A), in the program storage area 48a, a display program, a touch position detecting program, a block moving program, a ball moving program, a smoke processing program, a black hole (BH) processing program, an input and life counter program, a transmission program, a reception program, etc. are stored.

The display program displays a ball, a block, smoke, a black hole (BH), etc. on the LCD 14, and displays a block, smoke, a BH, etc. of an opponent on the LCD 12. The touch position detecting program detects a touch position via the touch panel 22. The block moving program moves a block. The ball moving program moves a ball. The smoke processing program executes a process relating to smoke, such as determination whether or not smoke is to be displayed, determination whether or not a touch is made on the smoke, etc. The black hole (BH) processing program executes a process relating a black hole, such as determination whether or not a black hole is to be displayed, determination whether or not the ball hits the black hole, etc.

The input and life counter program keeps count of an input counter value and count of a life counter value. Now, the input counter value means the time lapsed from hit of the ball with the smoke or the black hole, and the life counter value means the time lapsed from the start of the display of the smoke or the black hole.

The transmission program transmits to the opponent a smoke flag, a BH flag, end point and starting point coordinates, a transmitted coordinate, block-smoke-BH display coordinates, etc. via the wireless communication portion 64. The reception program receives a smoke flag, a BH flag, end point and starting point coordinates, a transmitted coordinate, block-smoke-BH display coordinates, etc. which are transmitted from the opponent via the wireless communication portion 64.

Referring to FIG. 3 (B), in the data storage area 48b, ball data, block data, smoke data, black hole (BH) data, a smoke flag, a black hole (BH) flag, an input counter value, starting point and end point coordinates, a transmitted coordinate, an opponent's block display coordinate, etc. are stored.

The ball data includes image data and display coordinate data. The block data includes image data, display coordinate data, and kind data. Here, the kind data indicates any one of "normal", "smoke", and "BH". The smoke data includes image data, display coordinate data, and a life counter value. The black hole (BH) data also includes image data, display coordinate data, and a life counter value. An opponent's block display coordinate is coordinate data for displaying a game image of a current opponent on the LCD 12. Additionally, in the data storage area 48b, white hole data is also stored, but it is similar to the black hole data, and therefore, the illustration and the description will be omitted.

A procedure of making two players (first player and second player) competitively play a game by utilizing the two game machines 10 constructed as described above is described with reference to FIG. 4 or FIG. 14. The game machine 10 operated by the first player is called "a first game machine", and the game machine 10 operated by the second player is called "a second game machine".

Figure 4:
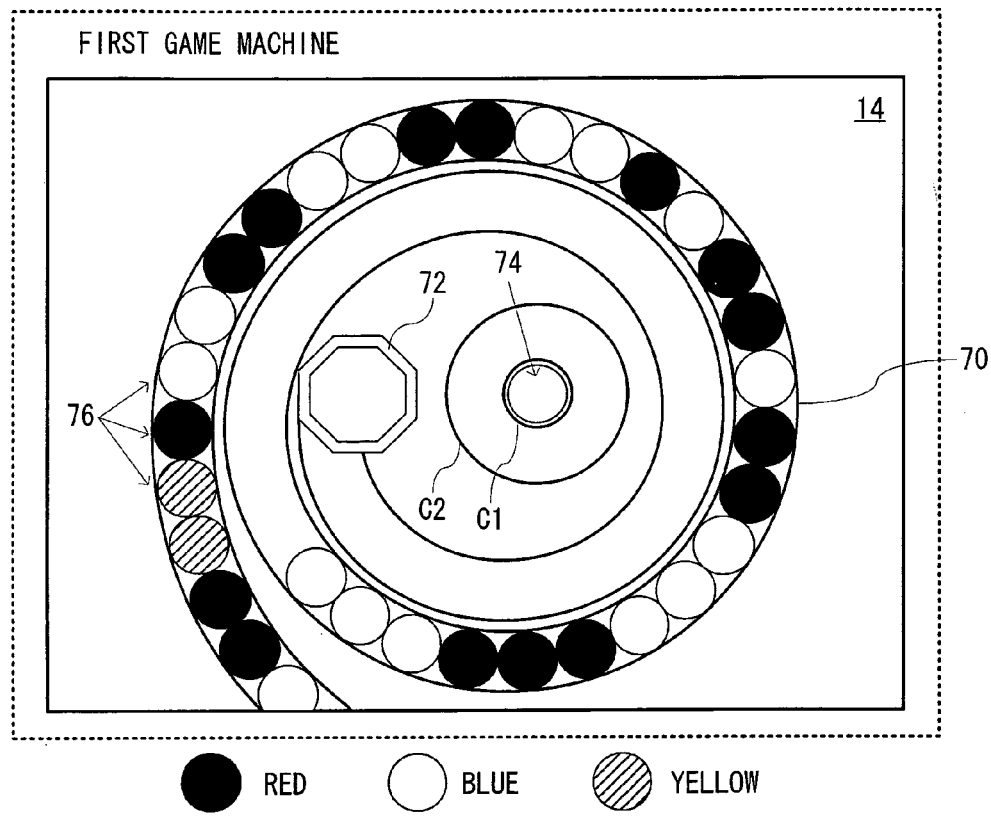
FIG. 4 is an illustrative view showing one example of an LCD display applied to FIG. 1 embodiment.

With reference to FIG. 4, when the game is started, a game image is displayed on the LCD 14 of the first game machine. In addition, a similar game image is displayed on the LCD 14 of the second game machine, also. The game image includes a spiral groove 70, a goal 72, a ball (bullet) 74, and a plurality of blocks (targets) 76. The groove 70 is arranged at a preset position within a game space, and the goal 72 is placed at the one end of the groove 70 (around the center of the spiral). The plurality of blocks 76 move to the goal 72 along the groove 70 at a predetermined speed. With the movement, a new block 76 appears. When a leading block 72 reaches the goal, the first player is lost in the game, resulting in the game end.

The ball 74 has any one of red, blue, and yellow color (these three colors are called "a normal color"). Each of the plurality of blocks 76 has any one of red, blue, yellow, gray, black, and white color (the latter three colors are called "a specific color"; see FIG. 9 and FIG. 13).

Figure 5:
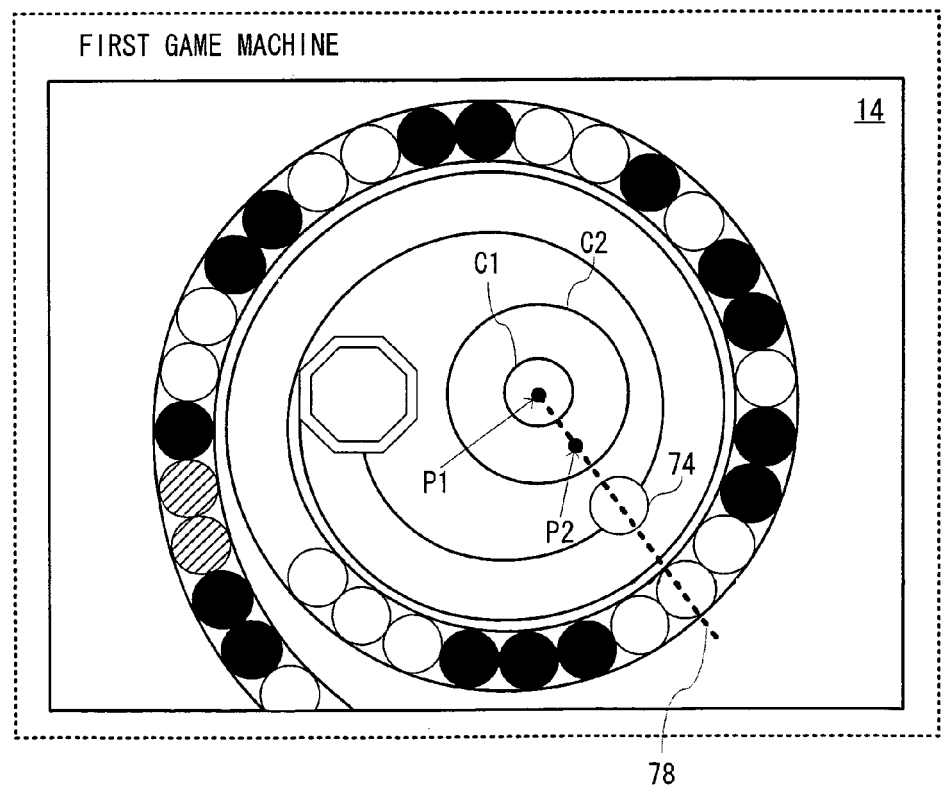
FIG. 5 is an illustrative view showing another example of the LCD display applied to FIG. 1 embodiment.

Referring to FIG. 5, the ball 74 is arranged inside a first circumference C1 which is placed next to the goal 72, and ejected to the outside of the first circumference C1 according to a touch with the stick 24. More specifically, the touch-on coordinate detected by the touch panel 22 is included in the first circumference C1, and at the instant when the touch locus successively detected reaches a second circumference C2 including the first circumference C1, the ball 74 moves to start.

The moving direction of the ball 74 is a direction directed from the center P1 of the first circumference C1 to an intersection point P2 of the touch locus and the second circumference C2, and the moving speed of the ball 74 is inversely proportional to the time required for such a movement from the center P1 to the intersection point P2. That is, the ball 74 moves according to the direction of the stick 24, and in response to the speed of the stick 24.

Figure 6:
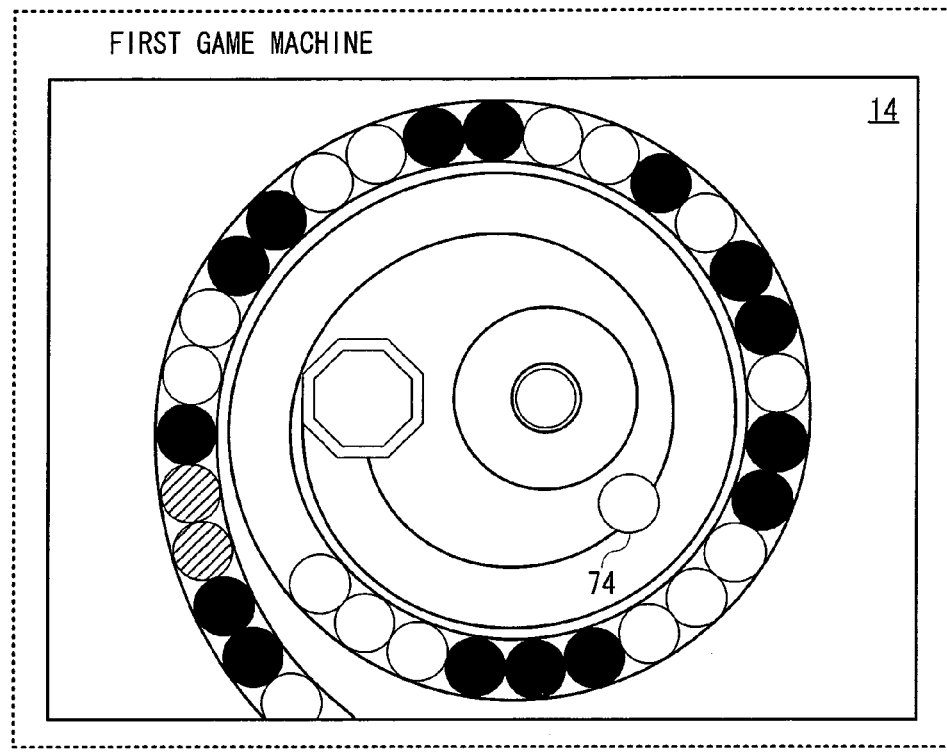
FIG. 6 is an illustrative view showing the other example of the LCD display applied to FIG. 1 embodiment.
Figure 7:
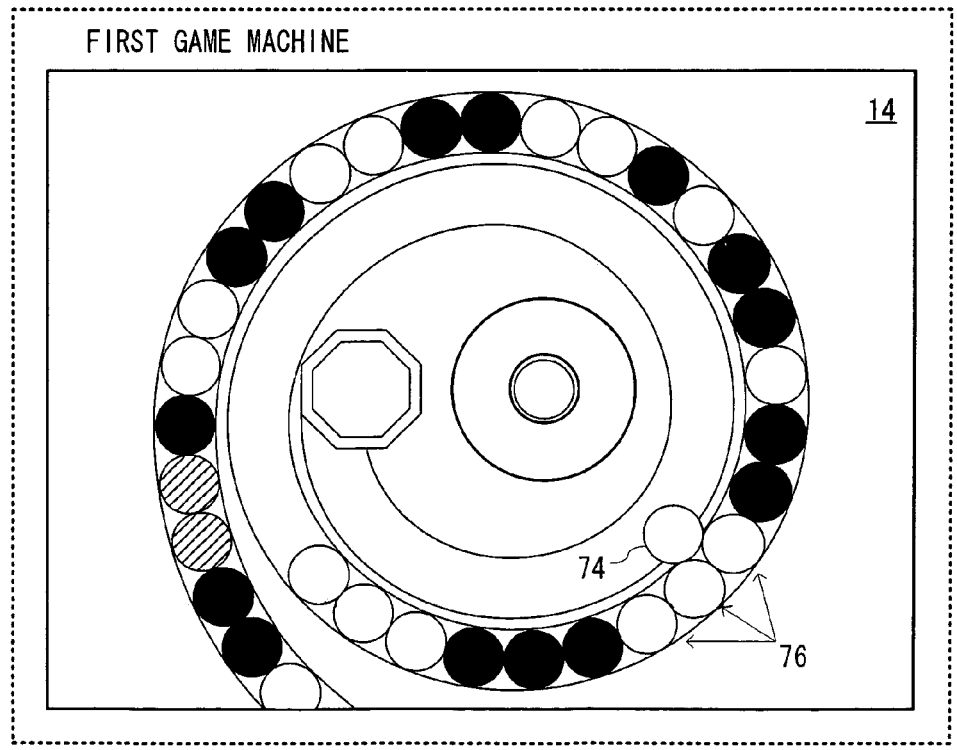
FIG. 7 is an illustrative view showing a further example of the LCD display applied to FIG. 1 embodiment.
Figure 8:
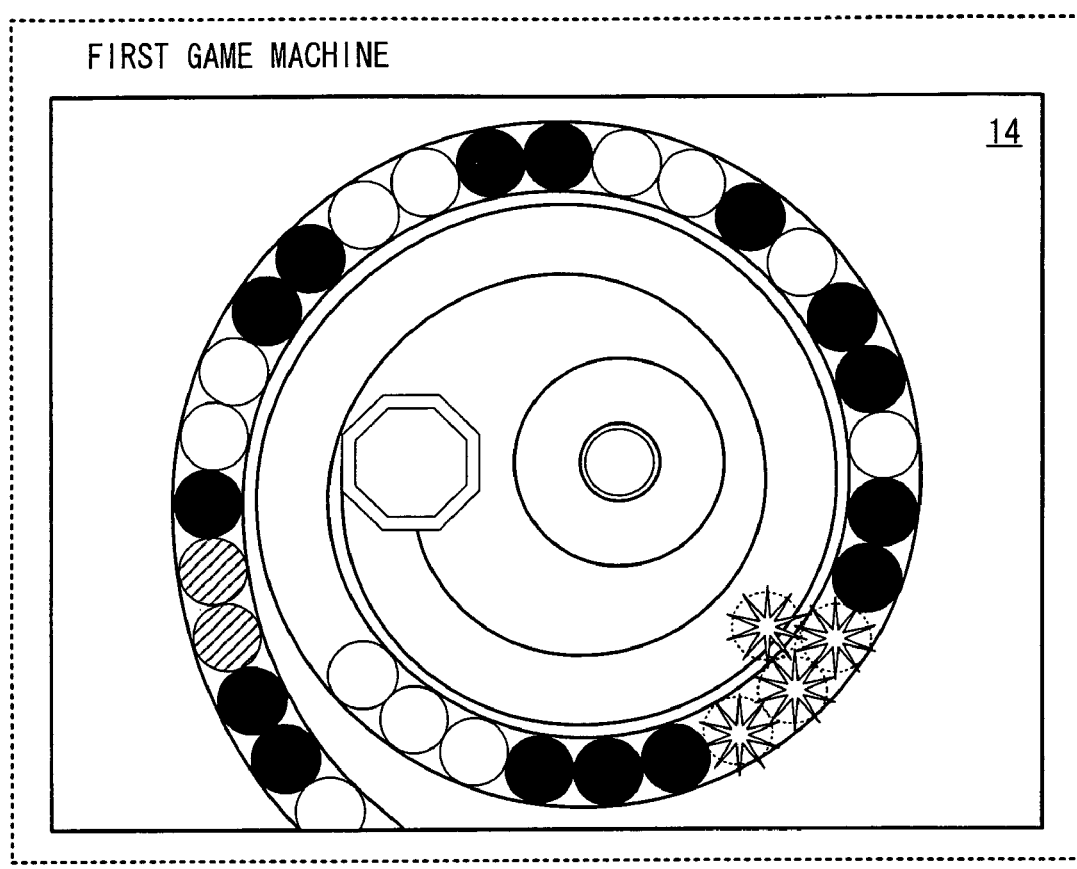
FIG. 8 is an illustrative view showing another example of the LCD display applied to FIG. 1 embodiment.
Figure 11:
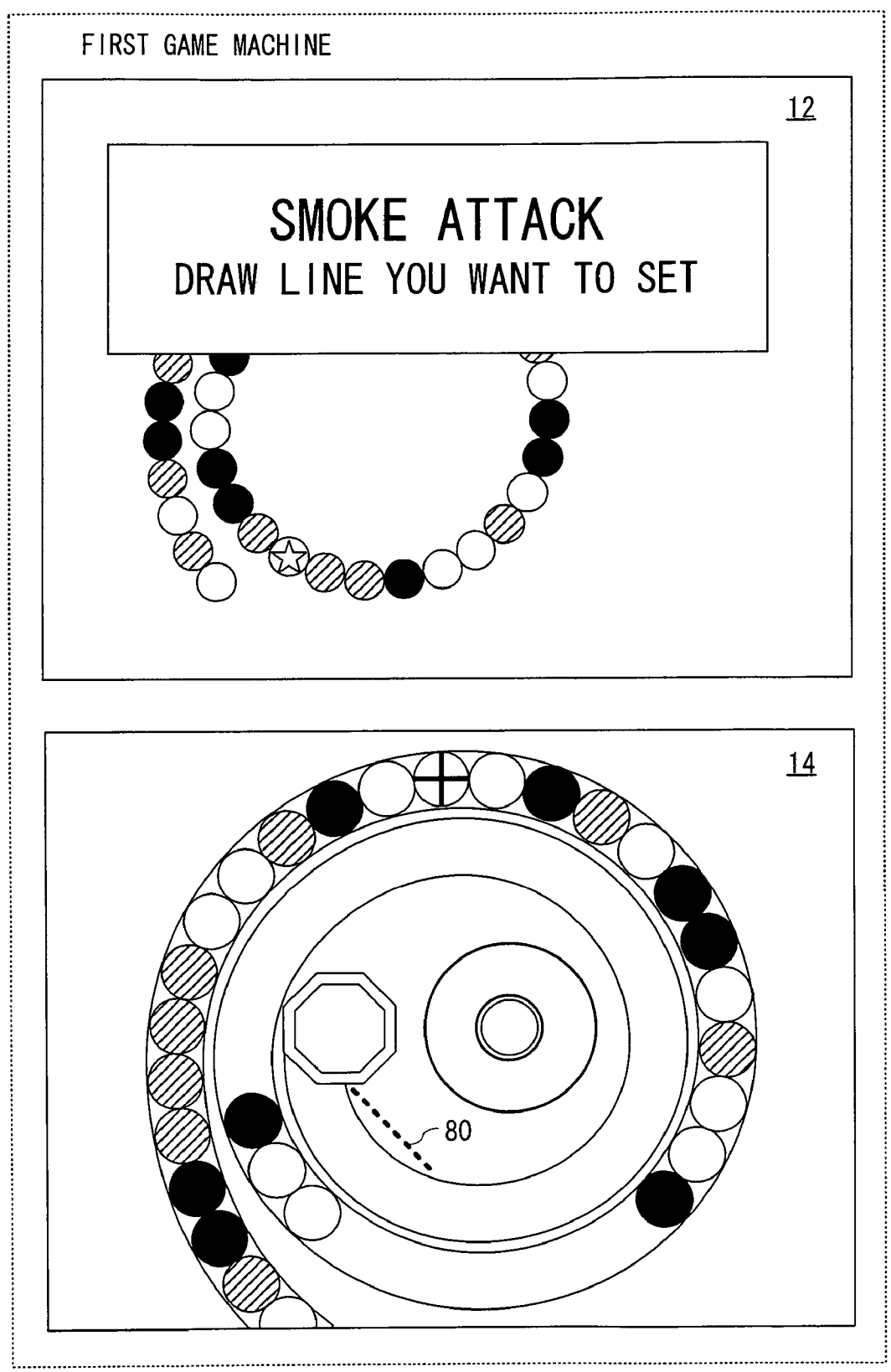
FIG. 11 is an illustrative view showing another example of the LCD display applied to FIG. 1 embodiment.

Referring to FIG. 6 to FIG. 8, when the ejected ball 74 is hit with a block 76 of the same color, the block 76 disappears with the ball 74. In a case that the blocks 76 of the same color are successive, when the ball 74 hits any one of them, all the plurality of successive blocks 76 of the same color disappear.

Referring to FIG. 9 to FIG. 12, when the ball 74 hits a gray block 76g, the gray block 76g (and successive two yellow blocks) disappears with the ball 74, and a message indicating that a target line for a smoke attack is required is displayed on the LCD 12. Additionally, at this time, the ball 74 hits one of the successive two yellow blocks, and these two yellow blocks also disappear with the gray block 76g.

When the first player draws with the stick 24 a target line 80 on the touch panel 22 of the first game machine, the touch locus is detected by the touch panel 22, and the coordinate data corresponding to the detected touch locus is transmitted to the second game machine.

Here, the groove 70 and the goal 72 are drawn at the same position within the game space between the game image displayed on the LCD 14 of the first game machine and the game image displayed on the LCD 14 of the second game machine, and therefore, it is possible to precisely set a line via the touch panel 22 provided on the LCD 14. Also, a simple game image (block alignment of the opponent) is displayed on the LCD 12, and therefore, the first player can precisely set a line with reference to the opponent's game screen displayed on the LCD 12.

The second game machine receives coordinate data from the first game machine, and displays a smoke 82 in the received coordinate position on the LCD 14 as shown in FIG. 12. Thus, by operating the first game machine, it is possible to display the smoke 82 at a desired position on the screen of the LCD 14 of the second game machine. Thus, it is possible to display the smoke 82 at a suitable position, such as near the goal 72 and near the specific-colored block (76g, 76b, 76w), etc. As a result, the specific-colored block, the ball 74, the goal 72, etc. are covered with the smoke 82 to allow effective reduction of a playing ability of the opponent.

Figure 14:
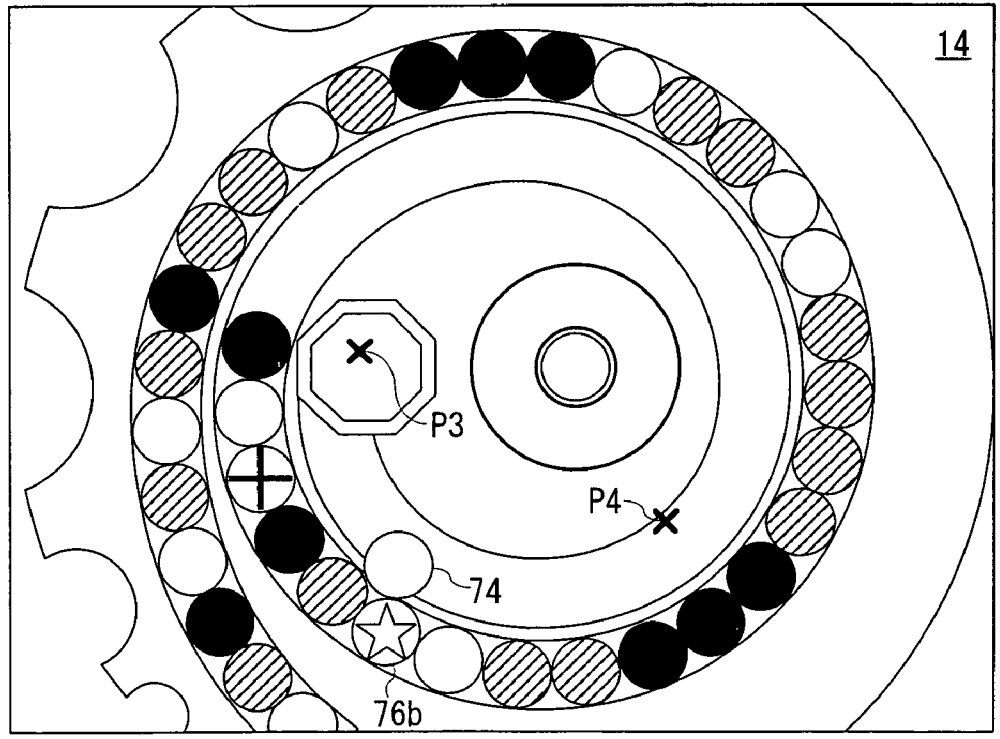
FIG. 14 is an illustrative view showing another example of the LCD display applied to FIG. 1 embodiment.

Referring to FIG. 13 to FIG. 15, when the ball 74 hits a black block 76b (shown by a star-shape in the drawing for the sake of convenience), a message indicating that touching two points as places for the black hole is required is displayed on the LCD 12. When the first player touches desired two points on the LCD 14 of the first game machine with the stick 24, the two touched points P3 and P4 are detected by the touch panel 22, and the coordinate data corresponding to the detected touched points P3 and P4 are transmitted to the second game machine.

The second game machine receives the coordinate data from the first game machine, and displays a black hole 84 at the received coordinate position on the LCD 14. The black hole 84 absorbs the ball 74 which is closer thereto. As a result, a collision of the ball 74 with the target block 76 is prevented.

Thus, by operating the first game machine, it is possible to display the black hole 84 at a desired position on the screen of the LCD 14 of the second game machine. Thus, it is possible to display the black hole 84 at a suitable position, such as near the goal 72 and near the specific-colored block (76g, 76b, 76w), etc. As a result, arriving at the goal 72 of the block 76 and a hit of the ball 74 to the specific-colored block are prevented, and thus, it is possible to reduce a playing ability of the opponent.

Also, in a case that the ball 74 hits the white block 76w, the process similar to the FIG. 13 to FIG. 15 is executed. More specifically, a message indicating that touching two points as places for the white hole is required is displayed on the LCD 12. When the first player touches desired two points on the touch panel 22 of the first game machine, the two touched points P3 and P4 are detected by the touch panel 22, and the corresponding coordinate data are transmitted to the second game machine. The second game machine receives such the coordinate data, and displays the white hole (84) at the received coordinate position within the LCD 14. The white hole (84) exerts a repulsive force to the ball 74 which is closing thereto. As a result, the moving direction of the ball 74 is changed, and a collision of the ball 74 with the target block 76 is prevented.

Figure 16:
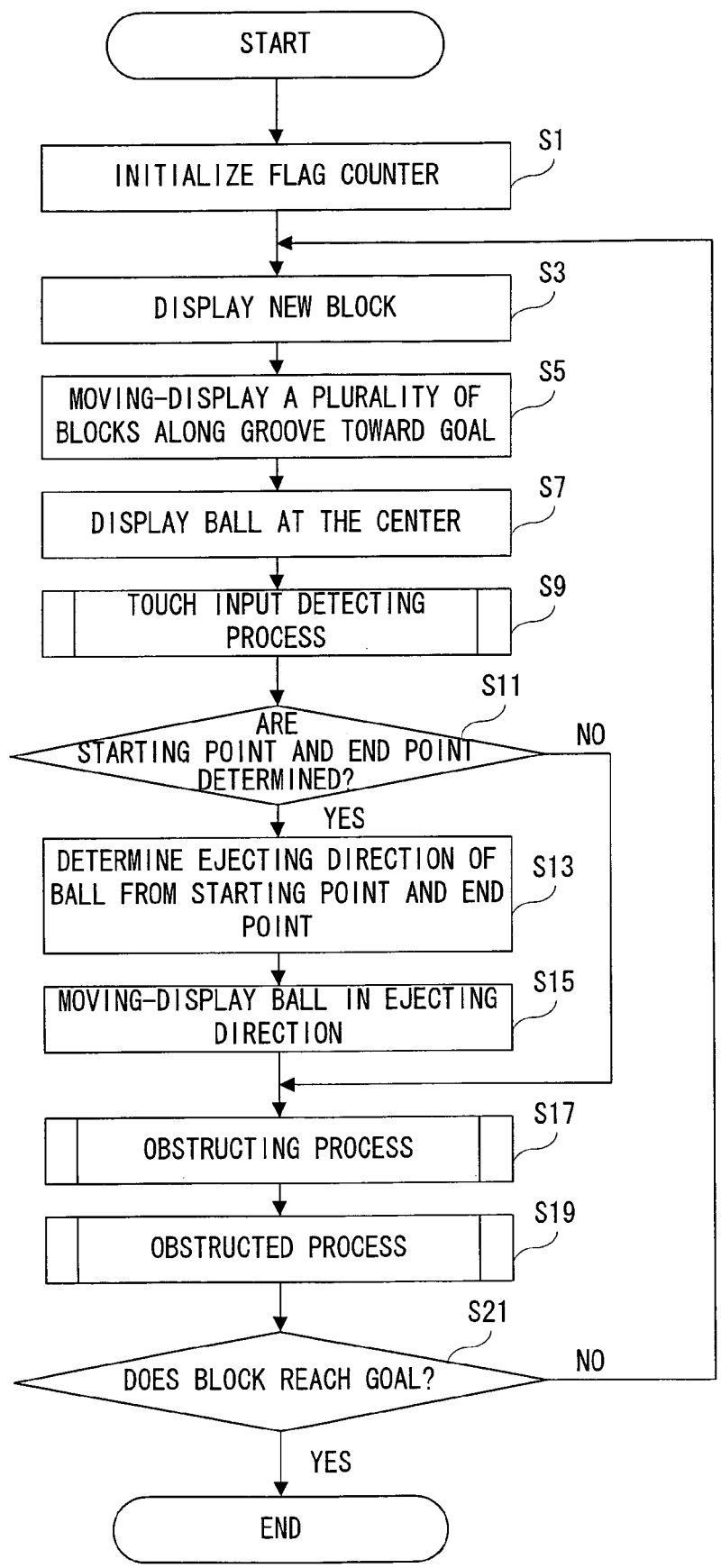
FIG. 16 is a flowchart showing another part of the operation of the CPU applied to FIG. 1 embodiment.

A processing operation of the CPU core 42 when a game is competitively played by utilizing the two game machines 10 constituted as described above is described with reference to FIG. 16 to FIG. 21. First, with reference to FIG. 16, the CPU core 42 initializes the smoke flag, the black hole (BH) flag, the input counter, the life counter, etc. in a step S1. In a step S3, a new block is displayed on the LCD 14 via the second GPU 52, the second VRAM 58, and the LCD controller 60. In a step S5, a plurality of blocks are moving-displayed along the groove toward the goal. In a step S7, a ball is displayed at the center of the game space.

In a step S9, a touch input to the touch panel 22 is detected via the I/F circuit 54. Additionally, the touch input detecting process will be described later. In a step S11, it is determined whether or not a starting point and an end point are determined, that is, it is determined whether or not the starting point and end point coordinates (see FIG. 3 (B)) are stored in the RAM 48. If "NO" here, the process proceeds to a step S17. If "YES" in the step S11, the process proceeds to a step S13, and an ejecting direction from the starting point coordinate and the end point coordinate is determined. In a succeeding step S15, the ball is moving-displayed in the ejecting direction, and then, the process shifts to the step S17.

In the step S17, an obstructing process (described later) is executed, and in a step S19, an obstructed process (described later) is executed. In a step S21, it is determined whether or not the block reaches the goal position. If "NO" here, the process returns to the step S3, and if "YES" is determined, the game is ended.

Figure 17:
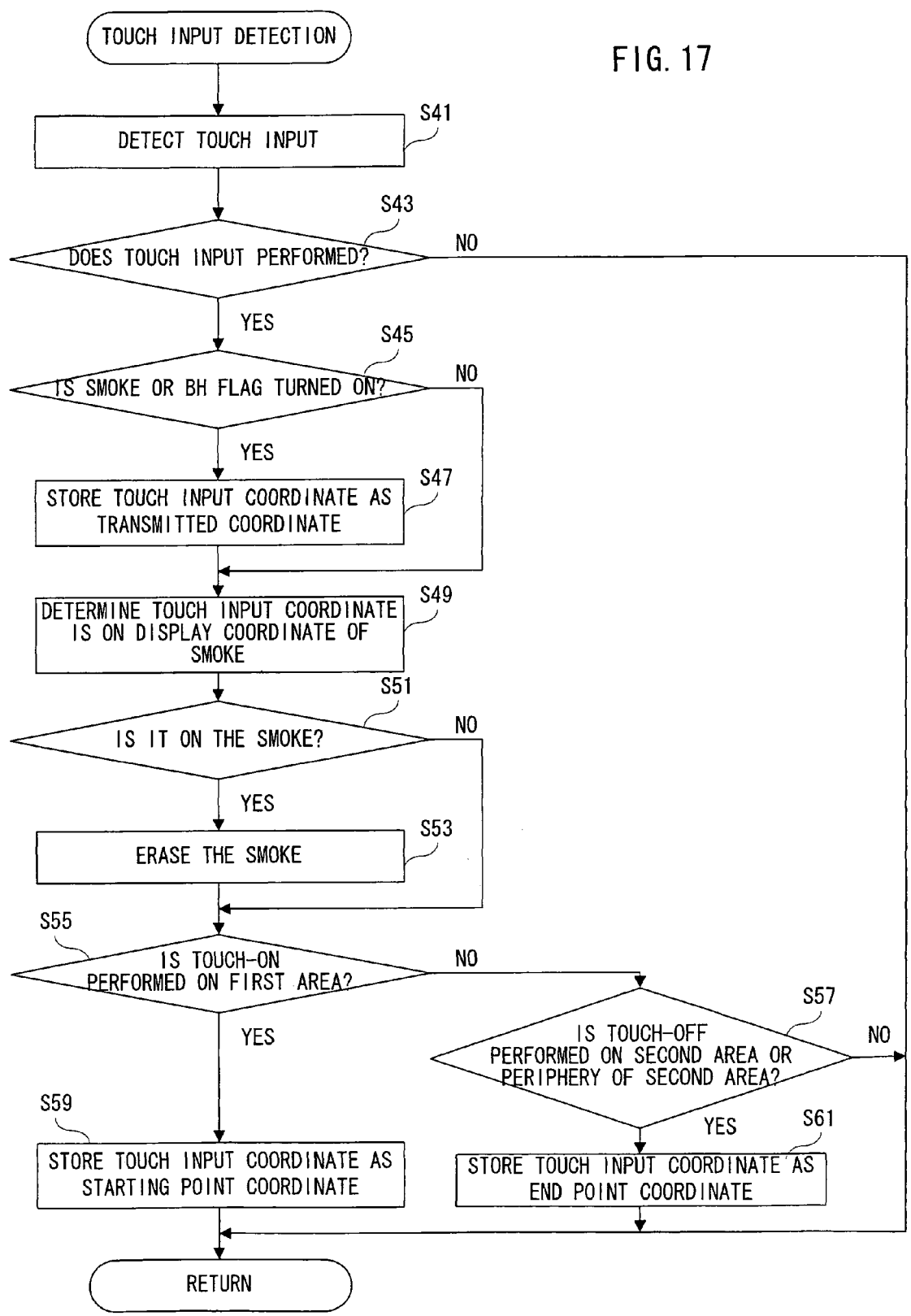
FIG. 17 is a flowchart showing the other part of the operation of the CPU applied to FIG. 1 embodiment.

The above-described touch input detecting process in the step S9 is executed according to the flowchart in FIG. 17. With reference to FIG. 17, in a step S41, a touch input to the touch panel 22 is detected via the I/F circuit 54. In a step S43, a presence or absence of the touch input to the touch panel 22 is determined. In a case of no touch input, the process is returned to the hierarchical upper level of the routine.

If the touch input is performed, the process shifts from the step S43 to a step S45 to determine whether or not the smoke flag or the BH flag is turned on. If "NO" here, the process proceeds to a step S49. If "YES" in the step S43, the process shifts to a step S47 to store coordinate data (hereinafter, referred to as "touch input coordinate") corresponding to the detected touch input as a transmitted coordinate (see FIG. 3(B)) in the RAM 48. After the storage, the process shifts to the step S49.

In the step S49, it is determined whether or not the touch input coordinate is included in the display area of the smoke (see FIG. 12). If at least a part of the touch input coordinate is included in the smoke displaying area, "YES" is determined in the step S49, and the process shifts to a step S53 to erase the smoke. After the erasure, the process shifts to a step S55. If the touch input coordinate is not included in the smoke displaying area, "NO" is determined in the step S51, and the process proceeds to the step S55.

In the step S55, it is determined whether or not a touch-on is performed within the first area corresponding to the ball, and if "YES" is determined, the touch input coordinate is stored as starting point coordinate (see FIG. 3 (B)) in the RAM 48 in a step S59. After the storage, the process is returned to the hierarchical upper level of the routine. If "NO" in the step S55, the process shifts to a step S57.

In the step S57, it is determined whether or not a touch-off is performed within a second area surrounding the ball, or it is determined whether or not the current touched point reaches the periphery of the second area. If "NO" here, the process is returned to the hierarchical upper level of the routine. If "YES" in the step S57, the process shifts to the step S61, and the touch input coordinate is stored as an end point coordinate in the RAM 48. After the storage, the process is returned to the hierarchical upper level of the routine.

Figure 18:
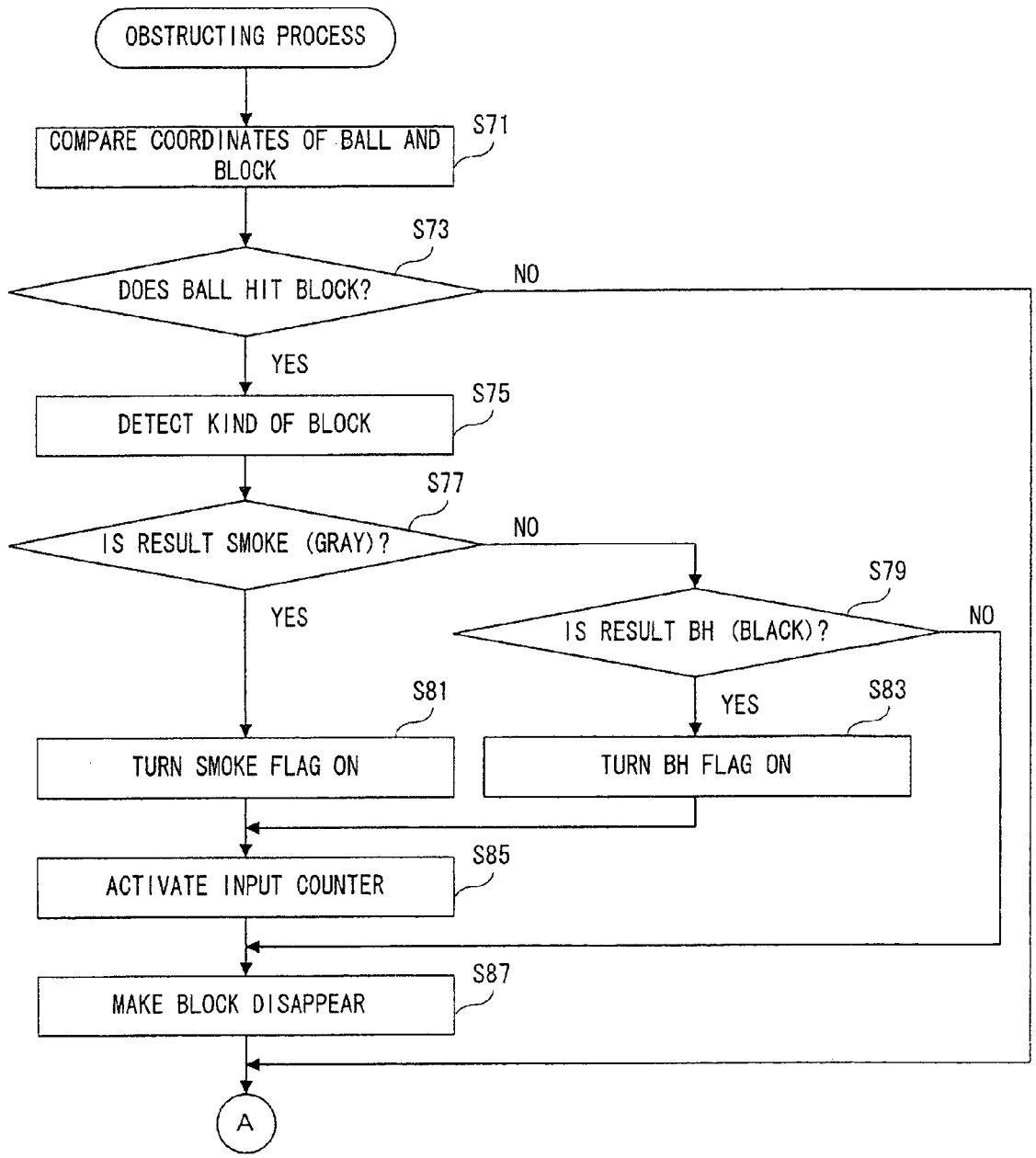
FIG. 18 is a flowchart showing a further part of the operation of the CPU applied to FIG. 1 embodiment.
Figure 19:
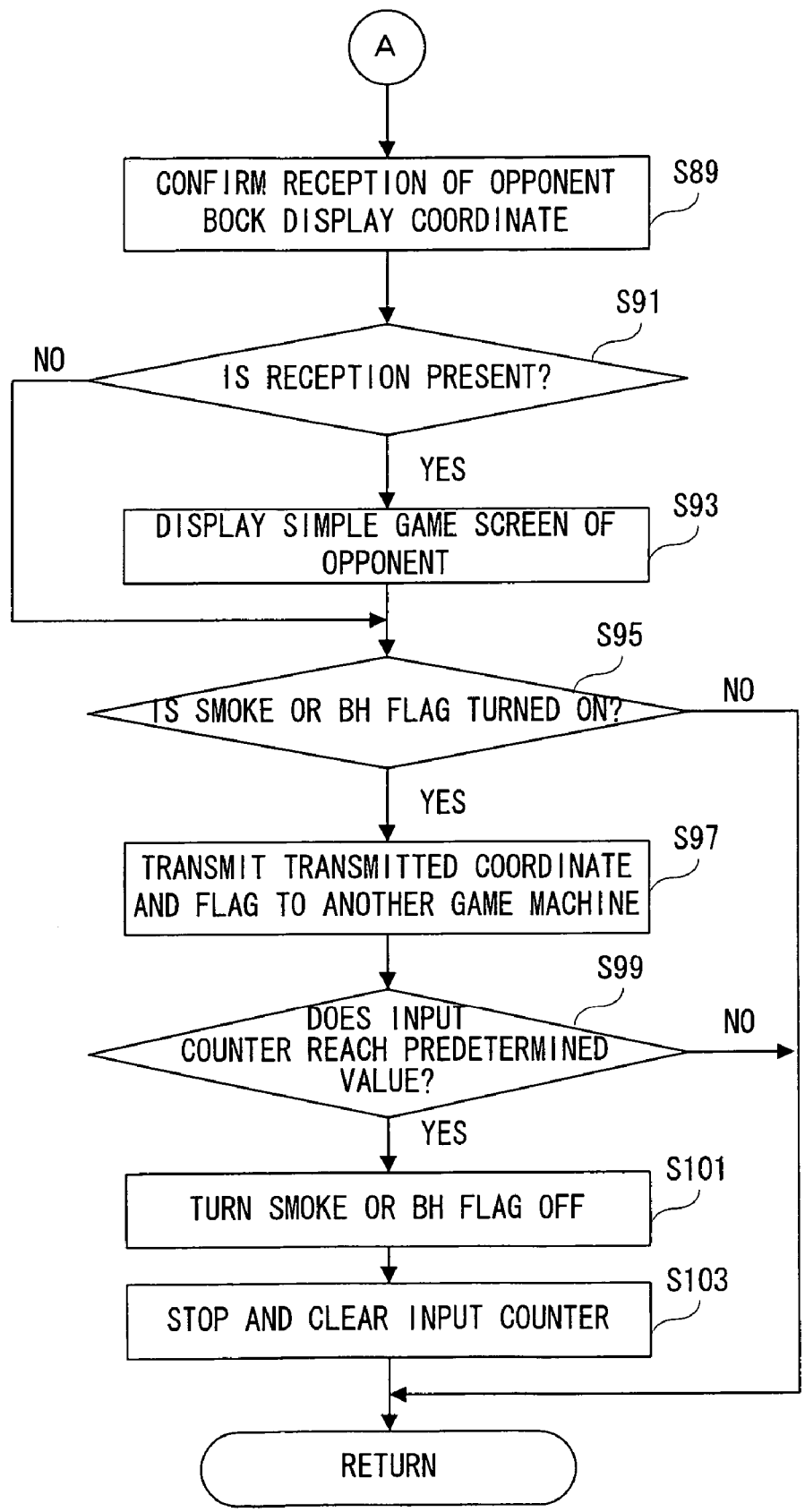
FIG. 19 is a flowchart showing another part of the operation of the CPU applied to FIG. 1 embodiment.

The obstructing process in the above-described step S17 is executed according to the flowcharts shown in FIG. 18 and FIG. 19. First, with reference to FIG. 18, in a step S71, the coordinate of the ball and the coordinate of the block are compared with each other. In a step S73, it is determined whether or not the ball hits the block on the basis of the comparison result. If "NO" here, the process proceeds to a step S89.

If "YES" in the step S73, the process shifts to a step S75 to detect the kind of the block that the ball hits. In a step S77, it is determined whether or not the result of the detection indicates a smoke (gray), and in a step S79, it is determined whether or not the result of the detection indicates a black hole (black). If "YES" in the step S77, the process shifts to step S81 to turn the smoke flag on, and if "YES" in the step S79, the process shifts to a step S83 to turn the BH flag on. After turning on the flag, the process proceeds to a step S85. In the step S85, the input counter is activated, and then, the process shifts to a step S87.

If "NO" in both of the steps S77 and S79, the process proceeds to the step S87. In the step S87, the block that the ball hits is made to disappear. After the disappearance, the process shifts to a step S89. Referring to FIG. 19, in the step S89, the opponent's block display coordinate in the RAM 48 is confirmed. In a step S91, the presence or absence of the reception of the opponent's block display coordinate is determined on the basis of the result of the confirmation, and if "NO" here, the process proceeds to a step S99.

If "YES" in the step S91, a simple game image on the opponent's side is displayed on the LCD 12 in a step S93. After the display, the process shifts to a step S95.

In the step S95, it is determined whether or not the smoke flag or the BH flag is turned on. If both of the flags are turned off, "NO" is determined in the step S95, and the process is returned to the hierarchical upper level of the routine. If at least one of the flag is turned on, "YES" is determined in the step S95, and the process shifts to a step S97. In the step S97, the transmitted coordinate and the flag (smoke flag and/or BH flag) are transmitted to the opponent's game machine via the wireless communication portion 64.

In the next step S99, it is determined whether or not an input counter reaches a predetermined value. If "YES" here, the smoke flag or the BH flag is turned off in a step S101, the input counter is stopped and cleared in a step S103, and the process is returned to the hierarchical upper level of the routine.

Figure 20:
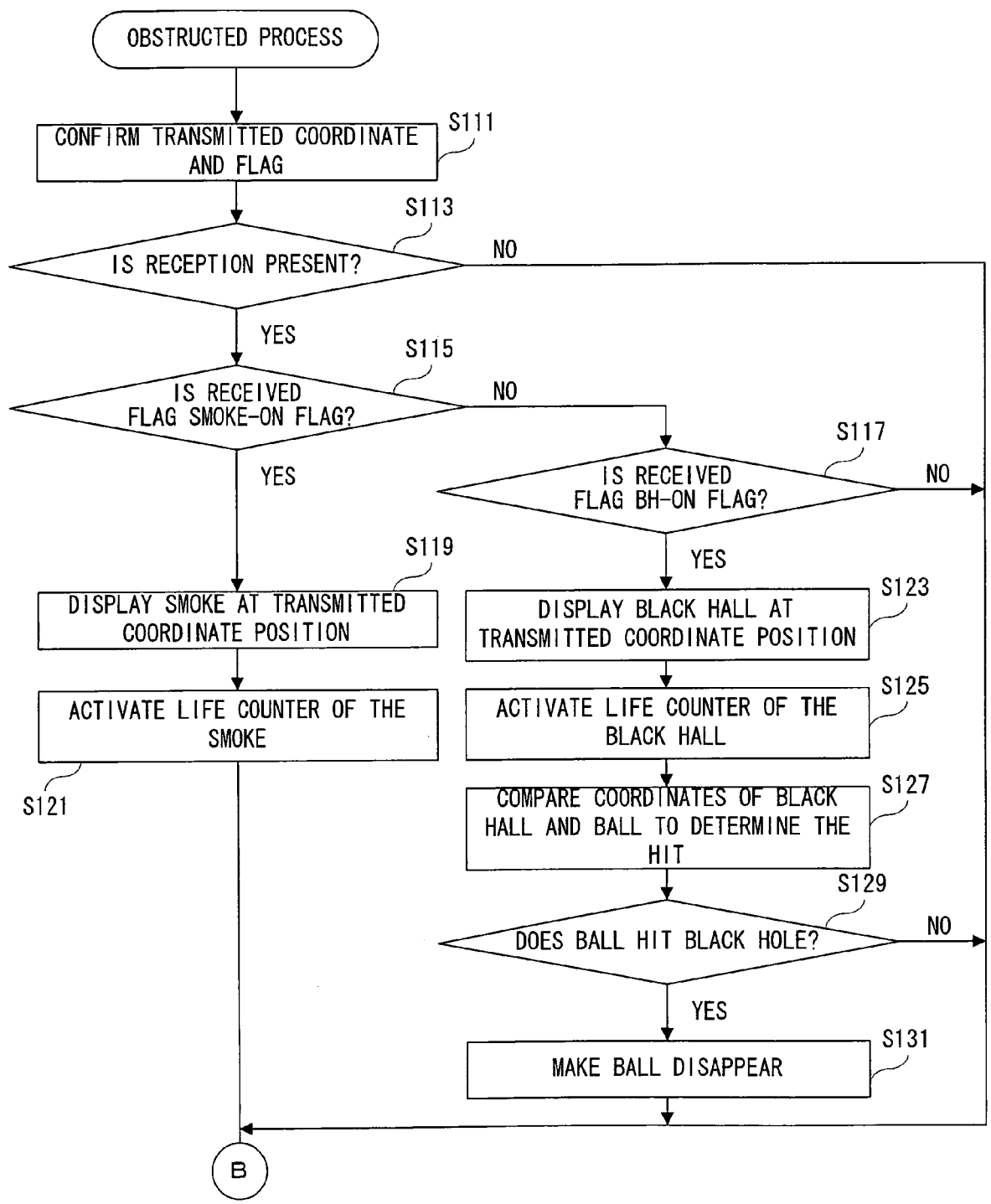
FIG. 20 is a flowchart showing the other part of the operation of the CPU applied to FIG. 1 embodiment.
Figure 21:
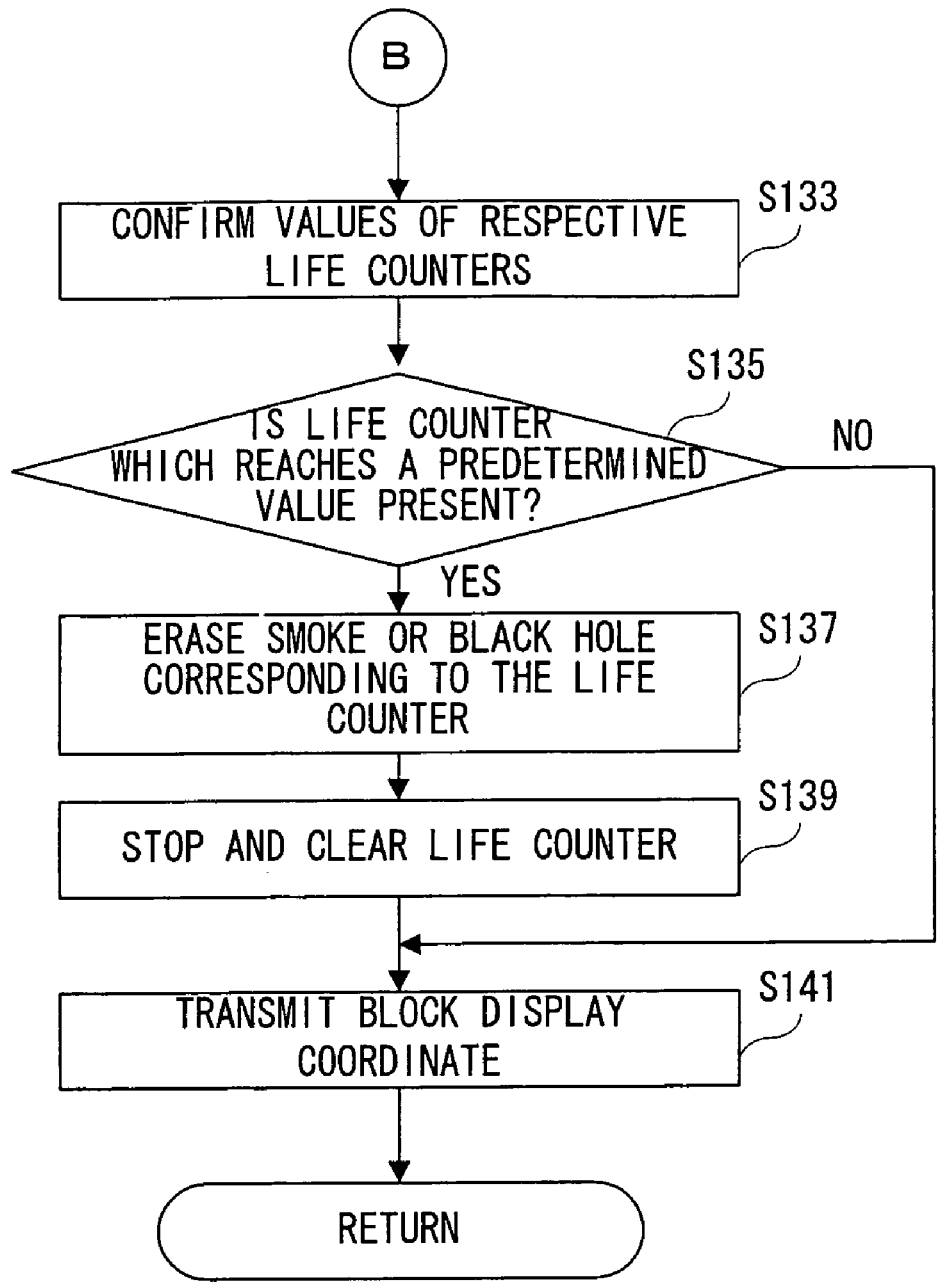
FIG. 21 is a flowchart showing a further part of the operation of the CPU applied to FIG. 1 embodiment.

The above-described obstructed process in the step S19 is executed according to the flowcharts in FIG. 20 and FIG. 21. First, referring to FIG. 20, in a step S111, the reception of the transmitted coordinate and the flag is confirmed, and in a step S13, the presence or absence of the reception is determined on the basis of the result of the confirmation. If the reception is performed, the process shifts to a step S115, and it is determined whether or not the received flag is a smoke-ON flag. If "YES" is determined here, the smoke is displayed at the transmitted coordinate position in a step S119, and the life counter of the smoke is activated in a step S121. After the activation of the counter, the process shifts to a step S133.

If "NO" in the step S115, the process shifts to a step S117 to determine whether or not the received flag is a black-hole-ON flag. If "NO" here, the process proceeds to a step S133.

If "YES" in the step S117, the black hole is first displayed at the transmitted coordinate position in a step S123, and a black-hole-life counter is succeedingly activated in a step S125. In addition, the coordinate of the black hole and the coordinate of the ball are compared in a step S127, and it is determined whether or not the ball hits the black hole on the basis of the comparison result in a step S129. If "NO" here, the process proceeds to a step S133, and if "YES" is determined, the ball is made to disappear in a step S131, and then, the process shifts to the step S133.

Referring to FIG. 21, values of the respective life counters are confirmed in the step S133. In a succeeding step S135, it is determined whether or not the life counter which reaches a predetermined value is present, and if "NO" here, the smoke corresponding to the life counter or the black hole corresponding to the life counter is erased. In a step S139, the life counter is stopped and cleared, and in a step S141, the block display coordinate is transmitted to the opponent via the wireless communication portion 64. After the transmission, the process is returned to the hierarchical upper level of the routine.

As understood from the above description, in this embodiment, the CPU core 42 displays a game image on the LCD 14 (S3, S7) and then executes a game processing to perform an updating process on the game image (S5, S13, S15, S87).

The CPU core 42 determines whether or not the result of the executed game processing satisfies a predetermined condition (S73, S77, S79), and if it is determined that the result satisfies the condition, a touch coordinate is detected via the touch panel 22 (S47), and the result of the detection is transmitted to the opponent via the wireless communication portion 64 (S101).

On the other hand, a touch coordinate from the opponent is received by the wireless communication portion 64 at an arbitrary timing. When receiving the opponent touched coordinate, the CPU core 42 thus displays an obstacle at the opponent touched coordinates position in the LCD 14 (S119, S123).

Thus, when the game result satisfies the predetermined condition, the touch coordinate is detected by the touch panel 22 on the LCD 14, and the detected touch coordinate is transmitted to the opponent. Then, the obstacle is displayed at a position corresponding to the touch coordinate on the LCD 14 of the opponent. In other words, the player plays a game such that the result satisfies the condition, and then performs a touch operation on a desired position on the LCD 14 to thereby display the obstacle at a position on the LCD 14 of the opponent the same as that of the touch operation. Thus, it is possible to make an effective attack on the opponent by utilizing the obstacle.

Also, the CPU core 42 detects the touch coordinate via the touch panel 22 when the result of the game processing does not satisfy the predetermined condition (S59, S61), and executes a game process on the basis of the detected result. In this manner, the touch coordinate detection for displaying the obstacle and the touch coordinate detection for the game processing are switched depending on whether or not the result of the game processing satisfies the predetermined condition. That is, it is possible to precisely perform two kinds of touch coordinate detection processes by means of one touch panel 22.

In addition, the CPU core 42 transmits a display coordinate of a moving element image (block 76) included in the game image displayed on the LCD 14 to the opponent via the wireless communication portion 64 (S141). On the other hand, a display coordinate transmitted from the opponent is received by the wireless communication portion 64. The CPU core 42 displays on the LCD 12 the moving element image included in the opponent game image on the basis of the received opponent display coordinate. The player can know the arrangement of the moving element image on the opponent's LCD 14 with reference to the LCD 12, and thus is able to make an effective attack.

It should be noted that in this embodiment, it is determined whether or not the touch input coordinate is included in the display area of the smoke (see FIG. 12) (S49), and if "YES" is determined, the smoke is erased (S53). However, as another method, if the game machine 10 has a microphone, the presence or absence of a voice input for blowing the smoke via the microphone is determined, and if the voice input is performed, the smoke may be erased.

Although example embodiments of the present invention has been described and illustrated in detail, it is clearly understood that the same is by way of illustration and example only and is not to be taken by way of limitation, the spirit and scope of example embodiments of the present invention being limited only by the terms of the appended claims.

What is claimed is:

1. A non-transitory recording medium recording a game program to play a communication game by utilizing two game machines each having a first screen, a coordinate designating unit to designate a coordinate on said first screen, a communication device, and a processor, said game program causes each of the processors of said two game machines to execute a method comprising:
    executing a game process in response to an operation by a player;
    generating a game image according to a result of the process by said executing a game process;
    displaying said game image on said first screen;
    determining whether or not a predetermined condition is satisfied;
    transmitting the designated coordinate detected by said coordinate designating unit to said opponent's game machine through said communication device when the condition is satisfied by said determining; and
    displaying an obstacle image at a position corresponding to said designated coordinate on said game image when said designated coordinate is received by said communication device.

2. A non-transitory recording medium recording a game program according to claim 1, wherein said determining determines whether or not the result of the processing by said executing a game process satisfies a predetermined condition.

3. A non-transitory recording medium recording a game program according to claim 1, wherein
    said executing a game process executes a game process according to a designated coordinate detected by said coordinate designating unit.

4. A non-transitory recording medium recording a game program according to claim 3, wherein
    said executing a game process executes a game process according to the designated coordinate detected by said coordinate designating unit when it is determined that the predetermined condition is not satisfied by said determining, and stops the game process according to the designated coordinate detected by said coordinate designating unit when it is determined that the predetermined condition is satisfied.

5. A non-transitory-recording medium recording a game program according to claim 1, wherein
said generating a game image generates a game image including a first image which is displayed at a predetermined position on said first screen irrespective of an operation by the player and a second image whose display position is changed according to an operation by the player.

6. A non-transitory recording medium recording a game program according to claim 5, wherein
said generating a game image generates a game image such that a positional relationship between said predetermined position in said one game machine and said predetermined position in said other game machine are associated with each other.

7. A non-transitory recording medium recording a game program according to claim 5, wherein
each of said two game machines further has a second screen,
said game program further causes each of said processors of said two game machines to execute said method which further comprises:
transmitting a display coordinate of the second image displayed by said generating a game image through said communication device; and
displaying on said second screen arrangement information of said second image of said opponent's game machine on the basis of said display coordinate received by said communication device.

8. A non-transitory recording medium recording a game program according to claim 1, wherein
said displaying an obstacle image stop executes a displaying process over a predetermined time period.

9. A non-transitory recording medium recording a game program according to claim 8, wherein said displaying an obstacle image erases said display of the obstacle image when the designated coordinate detected by said coordinate designating unit is included in the display area of said obstacle image.

10. A non-transitory recording medium recording a game program according to claim 1, wherein
said displaying the game image includes displaying a target and displaying a bullet,
said executing a game process includes moving the displayed target to a predetermined direction, a determining a direction on the basis of the detected touch coordinate moving said bullet in the direction determined by said determining the direction, and causing said target to disappear when said bullet hits the target.

11. A non-transitory recording medium recording a game program according to claim 10, wherein
said predetermined condition is a condition that the bullet hits a specific target.

12. A non-transitory recording medium recording a game program according to claim 10, wherein,
said obstacle absorbs said bullet when said bullet passes through said obstacle.

13. A non-transitory recording medium recording a game program according to claim 10, wherein,
said obstacle changes the moving direction of said bullet when said bullet passes through said obstacle.

14. A game machine, comprising:
first displaying programmed logic circuitry for displaying a game image on a first screen;
touch panel provided on said first screen;
processing programmed logic circuitry for executing a game process, and performing an updating process on said game image;
determining programmed logic circuitry for determining whether or not the result of the game process executed by said processing programmed logic circuitry satisfies a predetermined condition;
first detecting programmed logic circuitry for detecting a touch coordinate via said touch panel when it is determined that the result satisfies the condition by said determining programmed logic circuitry;
first transmitting programmed logic circuitry for transmitting the result of the detection by said first detecting programmed logic circuitry to opponent's game machine; and
second displaying programmed logic circuitry for displaying an obstacle at a position corresponding to said touch coordinate when the touch coordinate is received from said opponent's game machine.

15. A game machine according to claim 14, wherein said determining programmed logic circuitry determines whether or not the result of the processing by said executed game process satisfies a predetermined condition.

16. A game machine according to claim 14, wherein
said game process is executed according to a detected touch coordinate.

17. A game machine according to claim 14, wherein
said game image generating programmed logic circuitry generates a game image including a first image which is displayed at a predetermined position on said first screen irrespective of an operation by the player and a second image whose display position is changed according to an operation by the player.

18. A game machine according to claim 14, wherein
said second displaying programmed logic circuitry executes a displaying process over a predetermined time period, and
said second displaying programmed logic circuitry erases said display of the obstacle image when the detected touch coordinate is included in the display area of said obstacle image.

19. A game machine according to claim 14, wherein
said first displaying programmed logic circuitry includes a target displaying programmed logic circuitry for displaying a target and a bullet displaying programmed logic circuitry for displaying a bullet,
said processing programmed logic circuitry includes target moving programmed logic circuitry for moving the target displayed by said target displaying programmed logic circuitry to a predetermined direction, direction determining programmed logic circuitry for determining a direction on the basis of the touch coordinate detected by said second detecting programmed logic circuitry, bullet moving programmed logic circuitry for moving said bullet in the direction determined by said direction determining programmed logic circuitry, and disappearing programmed logic circuitry for causing said target to disappear when said bullet hits the target.

20. A control method of two game machines each having a first screen, a coordinate designating unit to designate a coordinate on said first screen, and a communication device,
said control method causes each of said two game machines to execute:

executing a game process in response to an operation by a player;

generating a game image according to the result of the process by said executing the game process;

displaying said game image on said first screen;

determining whether or not a predetermined condition is satisfied;

transmitting the designated coordinate detected by said coordinate designating unit to said opponent's game machine via said communication device when it is determined the condition is satisfied by said determining; and displaying an obstacle image at a position corresponding to said designated coordinate on said game image when said designated coordinate is received by said communication device.

21. A control method according to claim 20, wherein said determining including determining whether or not the result of the processing by said executed game process satisfies a predetermined condition.

22. A control method according to claim 20, wherein
said game process is executed according to the designated coordinate.

23. A control method according to claim 20, wherein
said generating the game image game image includes generating a first image which is displayed at a predetermined position on said first screen irrespective of an operation by the player and generating a second image whose display position is changed according to an operation by the player.

24. A control method according to claim 20, wherein
said displaying the obstacle image includes a displaying process executed over a predetermined time period, and
said displaying the obstacle image includes erasing said display of the obstacle image when the designated coordinate is included in the display area of said obstacle image.

25. A control method according to claim 20, wherein
said displaying the game image includes displaying a target and a bullet,
said executing the game process includes moving the displayed target to a predetermined direction, determining a direction on the basis of the designated coordinate, moving said bullet in the determined direction, and causing said target to disappear when said bullet hits the target.

* * * * *